United States Patent [19]
Yasuki et al.

[11] Patent Number: 5,712,689
[45] Date of Patent: Jan. 27, 1998

[54] DIGITAL TELEVISION SET

[75] Inventors: Seijiro Yasuki; Shigeru Tashiro; Hiroyuki Chimoto, all of Yokohama, Japan

[73] Assignee: Kabushiki Kaisha Toshiba, Kawasaki, Japan

[21] Appl. No.: 531,286

[22] Filed: Sep. 20, 1995

[30] Foreign Application Priority Data

Sep. 20, 1994 [JP] Japan .................................. 6-225336

[51] Int. Cl.⁶ .................................................. H04N 5/445
[52] U.S. Cl. .......................... 348/561; 348/581; 348/568; 348/564; 348/571; 382/298
[58] Field of Search .................................. 348/561, 562, 348/563, 564, 568, 553, 571, 575, 578, 580, 581, 584, 585, 588, 720, 721, 239, 222, 445; 382/293, 298, 299; 345/119, 118, 112, 127, 129, 130, 189; H04N 5/445

[56] References Cited

U.S. PATENT DOCUMENTS

| | | | |
|---|---|---|---|
| 4,266,242 | 5/1981 | McCoy | 348/568 |
| 4,661,987 | 4/1987 | Andreson et al. | 348/581 |
| 5,121,205 | 6/1992 | Ng et al. | 348/568 |
| 5,165,070 | 11/1992 | Koyama et al. | 348/571 |
| 5,365,276 | 11/1994 | Imai et al. | 348/564 |
| 5,508,733 | 4/1996 | Kassatly | 348/13 |
| 5,566,251 | 10/1996 | Hanna et al. | 348/588 |

FOREIGN PATENT DOCUMENTS

| | | |
|---|---|---|
| 0 587 130 | 3/1994 | European Pat. Off. . |
| 44 02 447 | 8/1994 | Germany . |
| 686187 | 3/1994 | Japan . |
| 2 244 887 | 12/1991 | United Kingdom . |

OTHER PUBLICATIONS

"Broadcasting Method", Nippon Hoso Shuppan Kyokai, pp. 138–141, 244–251.

Ishikura et al, "Experimental Hardware of Letter–Box EDTV With Multiplexed LD (Vertical–Temporal Helper)/VH (Vertical Helper) Signals", ITE Technical Report, vol. 17, No. 65, pp. 19–41 (Oct. 1993).

Kawai et al, "A Study of ISDB Broadcasting System", ITEJ Technical Report, vol. 15, No. 35, pp. 31–36, BCS '91–18, ROFT '91–38 (Jun. 1991).

Ohsaki et al, "A Layered Model for ISDB System" ITEC '93: 1993 ITE Annual Convention, pp. 275 and 276.

Yoshimura et al, "A Study on Extended Funcations for Digital Television Service", ITEC '93: 1993 ITE Annual Convention, pp. 279 and 280.

Nikkei Electronics, No. 608, May 23, 1994, pp. 82–89.

*Primary Examiner*—John K. Peng
*Assistant Examiner*—Linus H. Lo
*Attorney, Agent, or Firm*—Cushman Darby & Cushman IP Group of Pillsbury Madison & Sutro LLP

[57] ABSTRACT

The horizontal processing circuits subject the image data input respectively to the compression processing or the expansion processing in the horizontal direction and output said processed image data. The transfer means composed of the bus controller 338 and the bus 333 transfers respective image data from the horizontal processing circuits time-divisionally. The vertical processing circuit 334 subjects the respective transferred image data to the compression processing or the expansion processing in the vertical direction time-divisionally. The post-processing circuit 335 and the display device 464 display the image data from the vertical processing circuit 334.

10 Claims, 18 Drawing Sheets

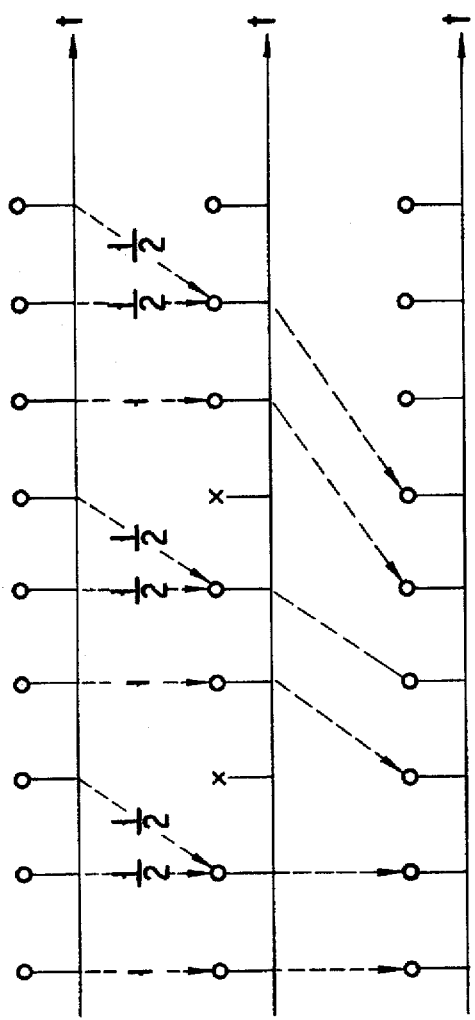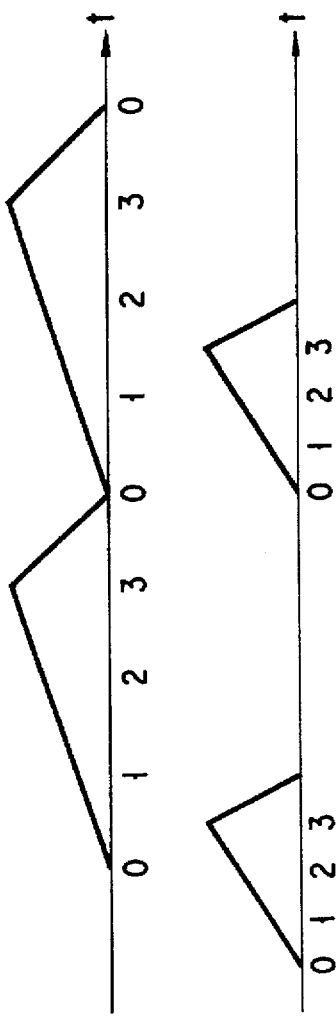
FIG. 3A INPUT IMAGE DATA
FIG. 3B OUTPUT OF THE ADDER 354
FIG. 3C OUTPUT OF MEMORIES 361 AND 362
FIG. 3D INPUT OF FIFO MEMORY 369
FIG. 3E OUTPUT OF FIFO MEMORY 369

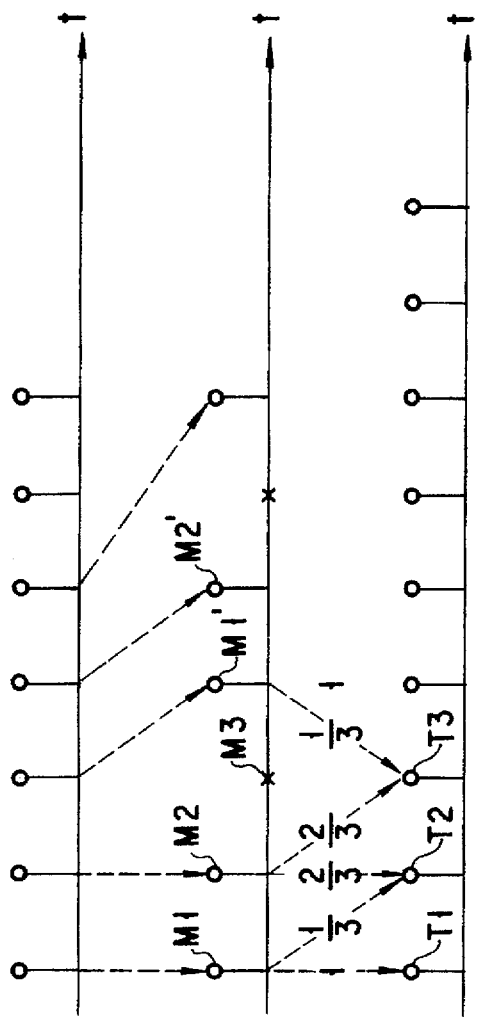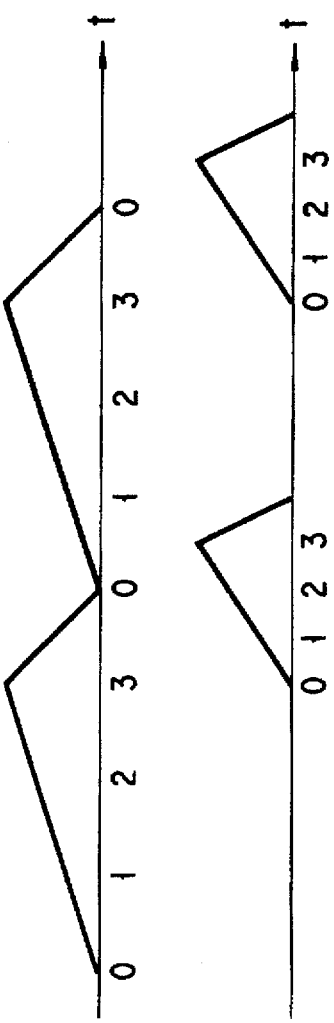

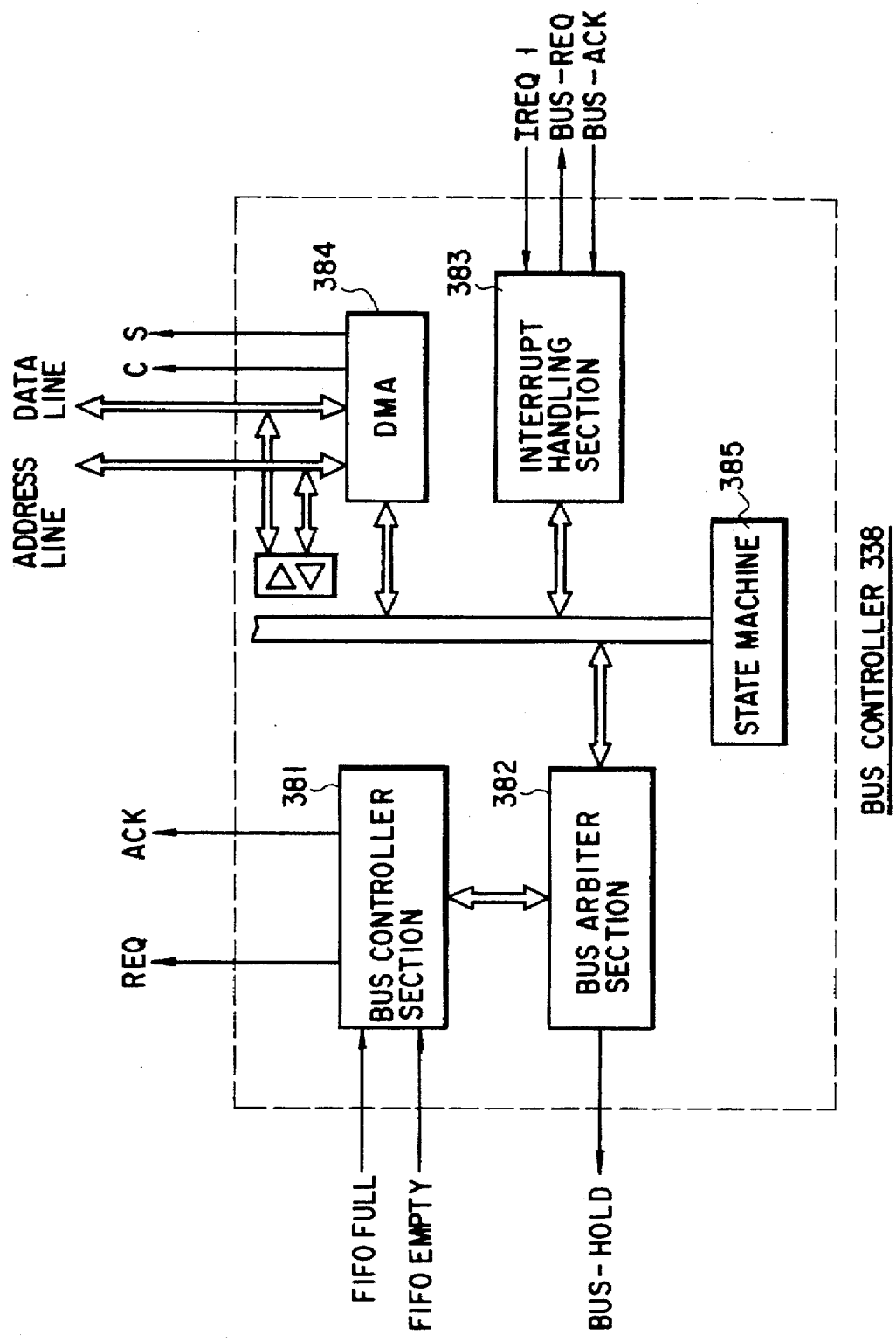
F I G. 5

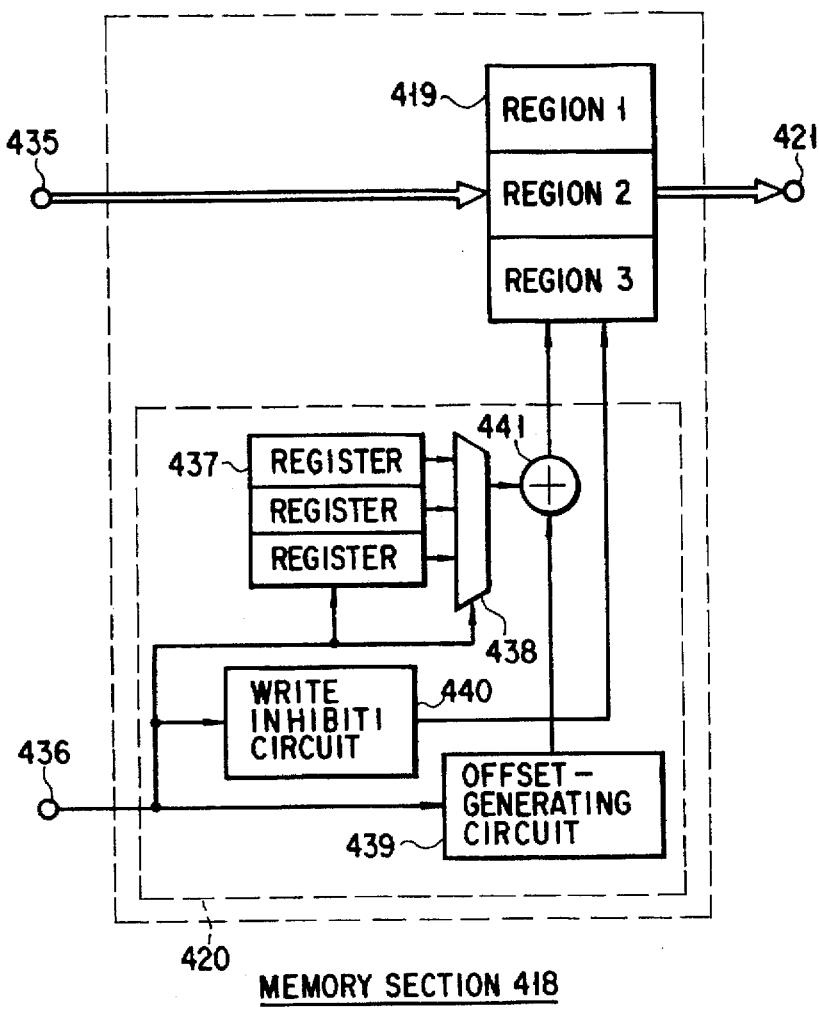
MEMORY SECTION 418
F I G. 9
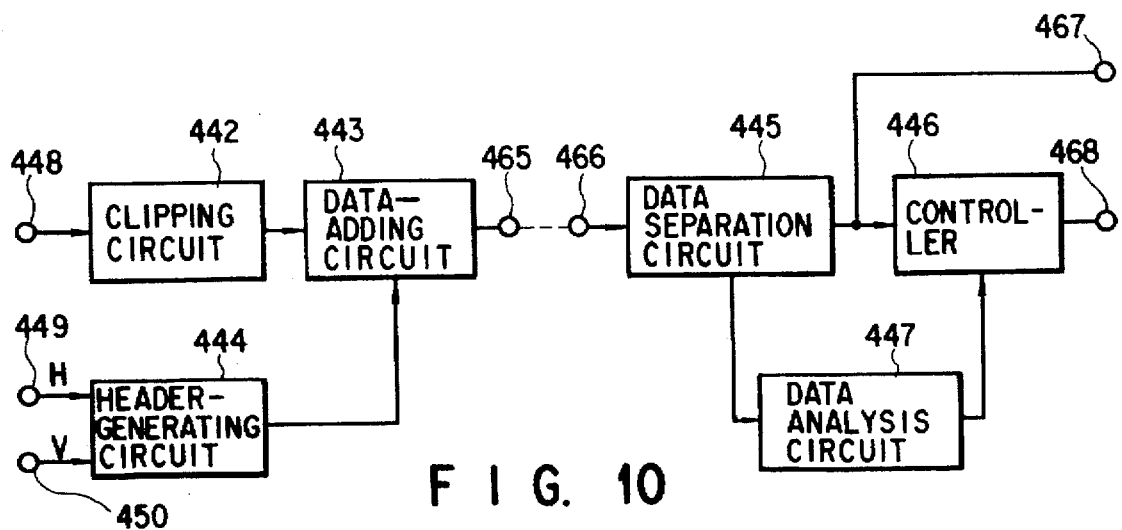
F I G. 10

F I G. 11A
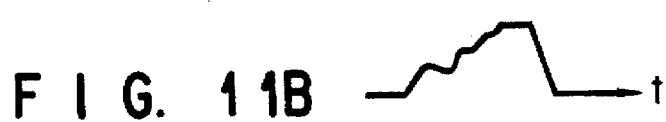
F I G. 11B
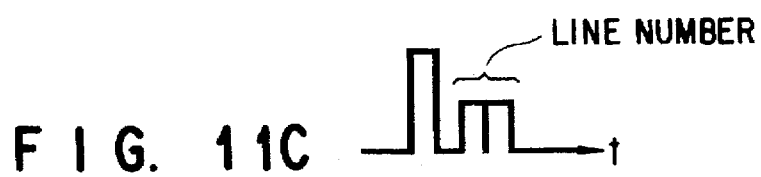
F I G. 11C
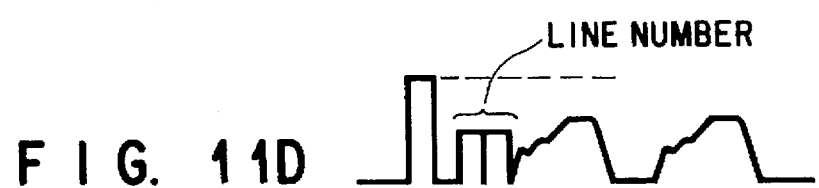
F I G. 11D
F I G. 11E
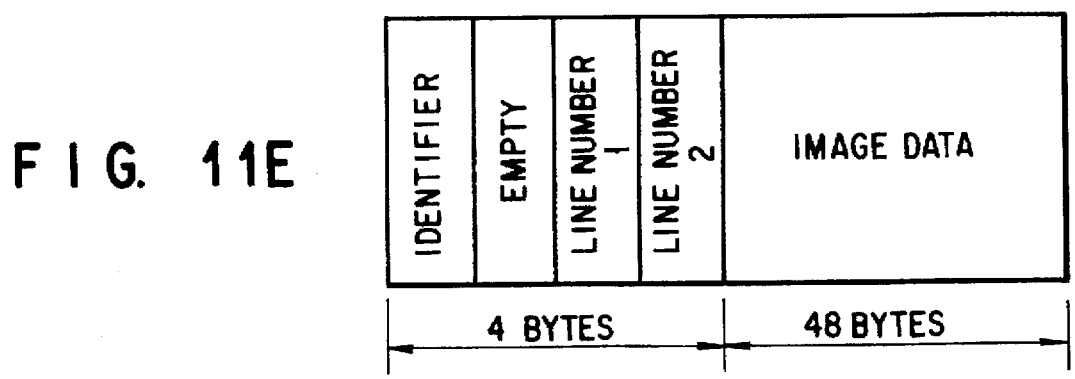

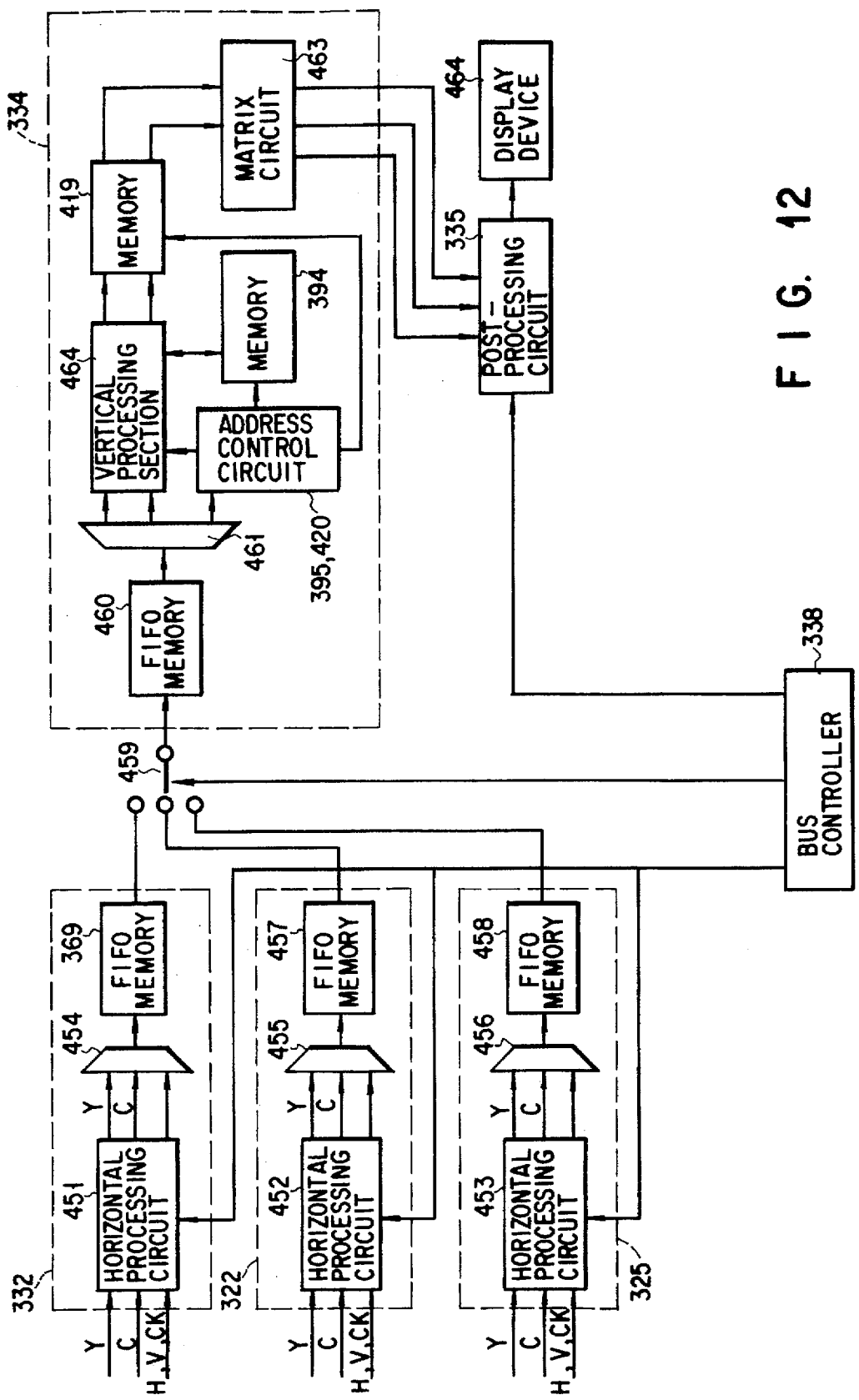
F I G. 12

VERTICAL PROCESSING CIRCUIT 334
(OTHER EMBODIMENT)

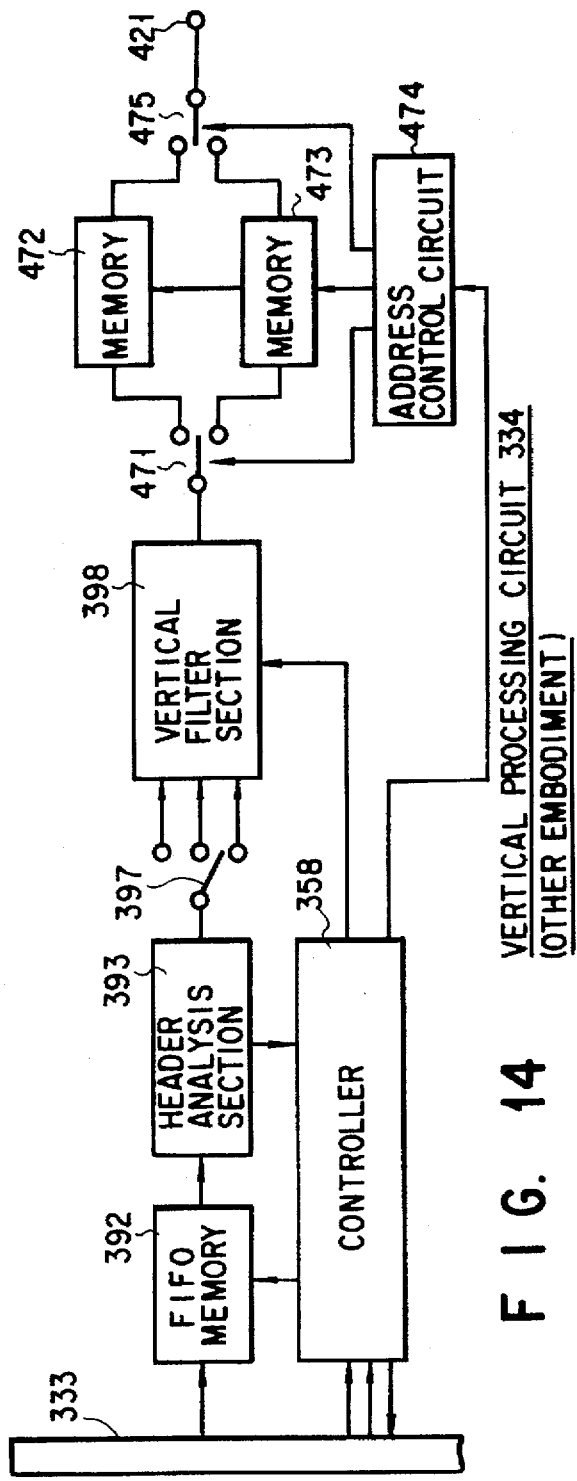
F I G. 14
VERTICAL PROCESSING CIRCUIT 334
(OTHER EMBODIMENT)
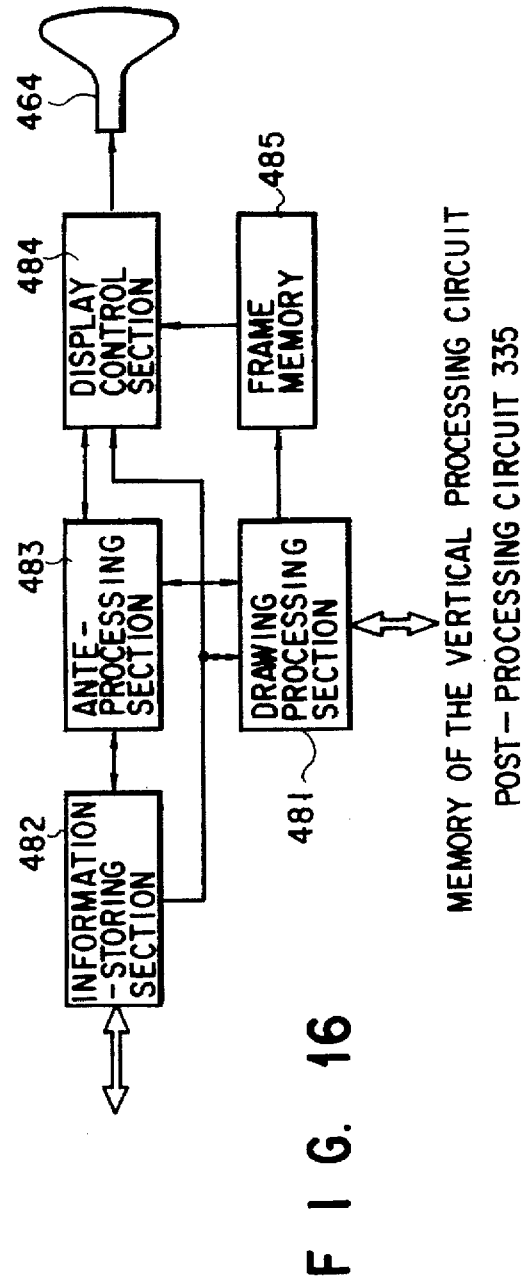
F I G. 16
MEMORY OF THE VERTICAL PROCESSING CIRCUIT
POST-PROCESSING CIRCUIT 335

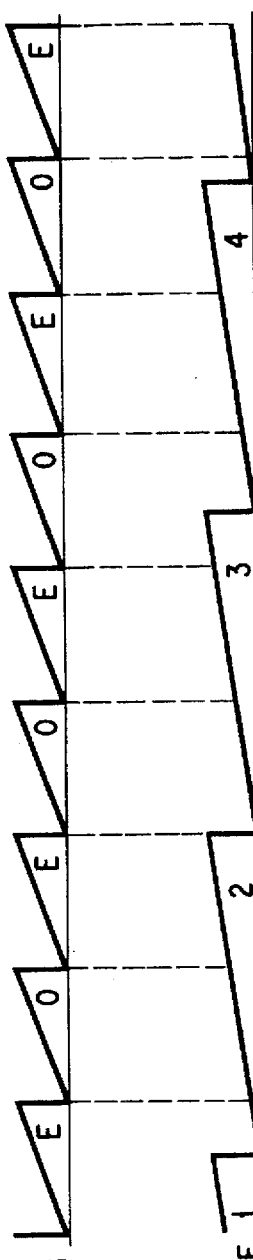
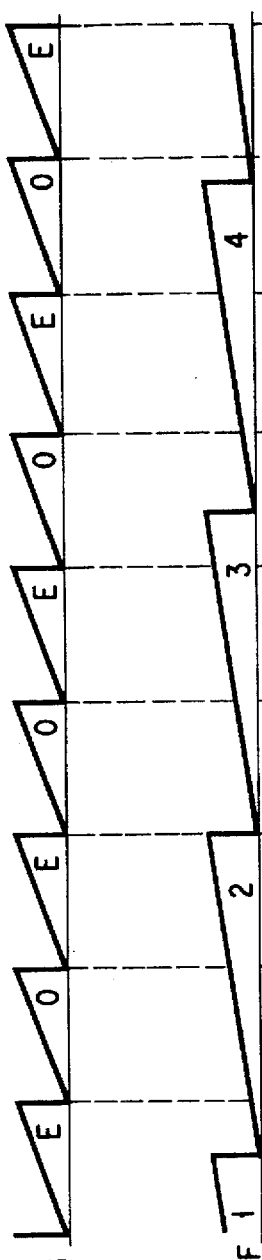
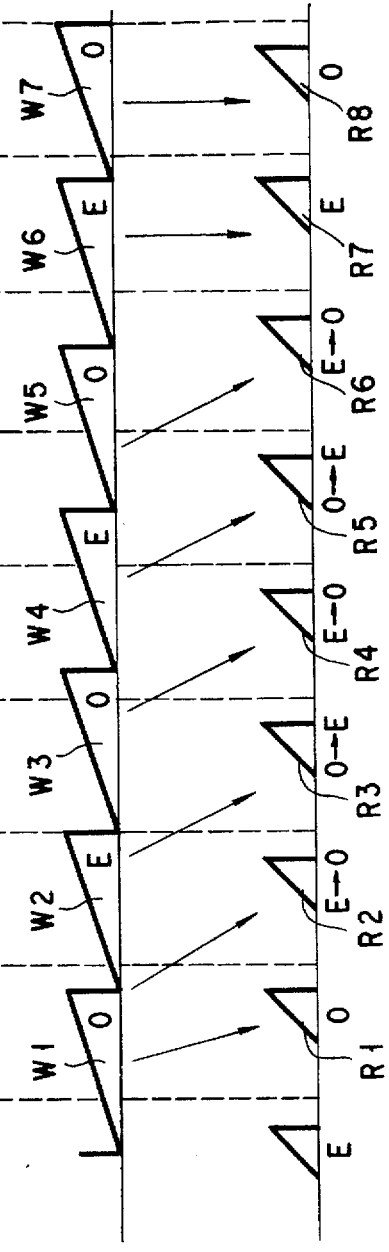

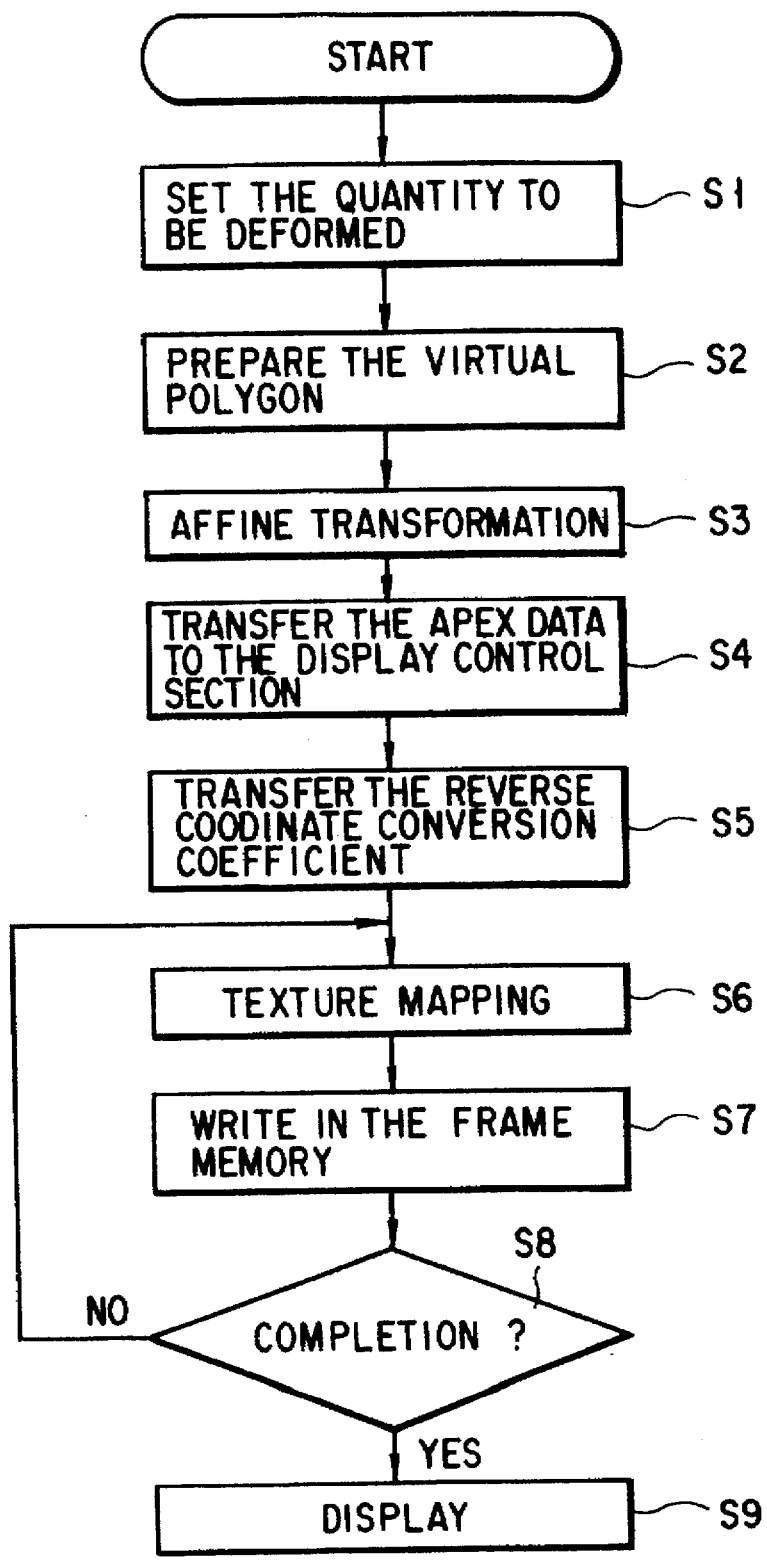
F I G. 17

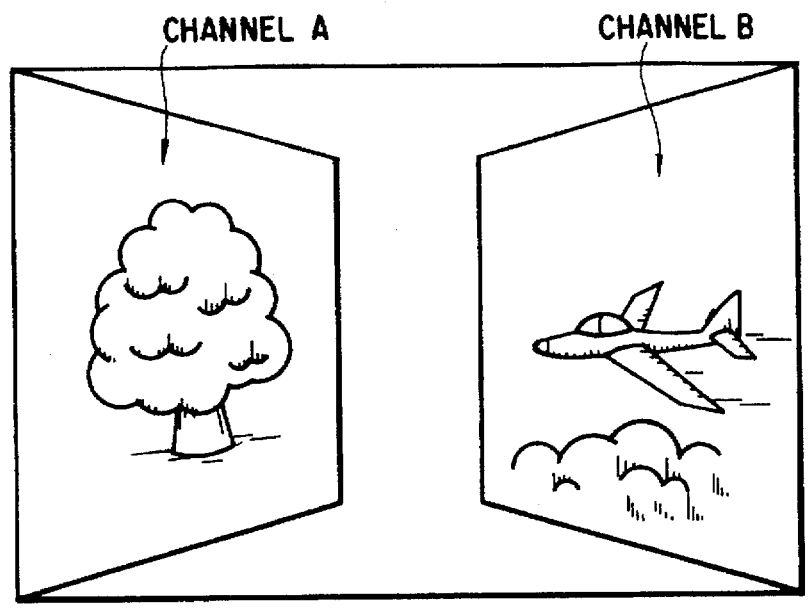
F I G. 18
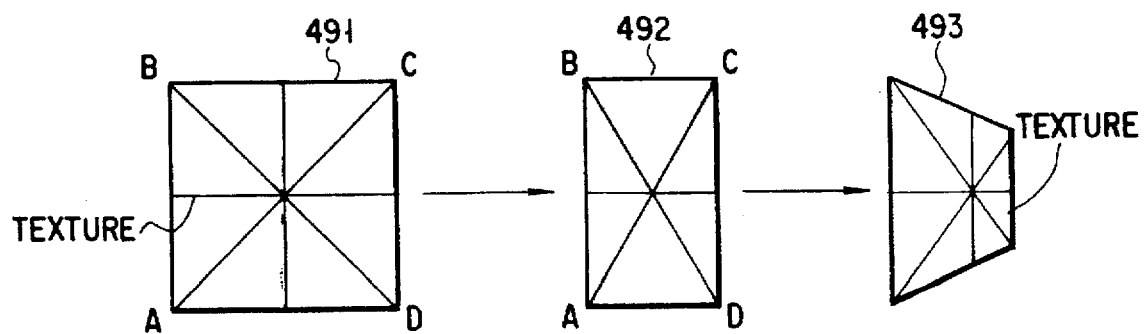
F I G. 19

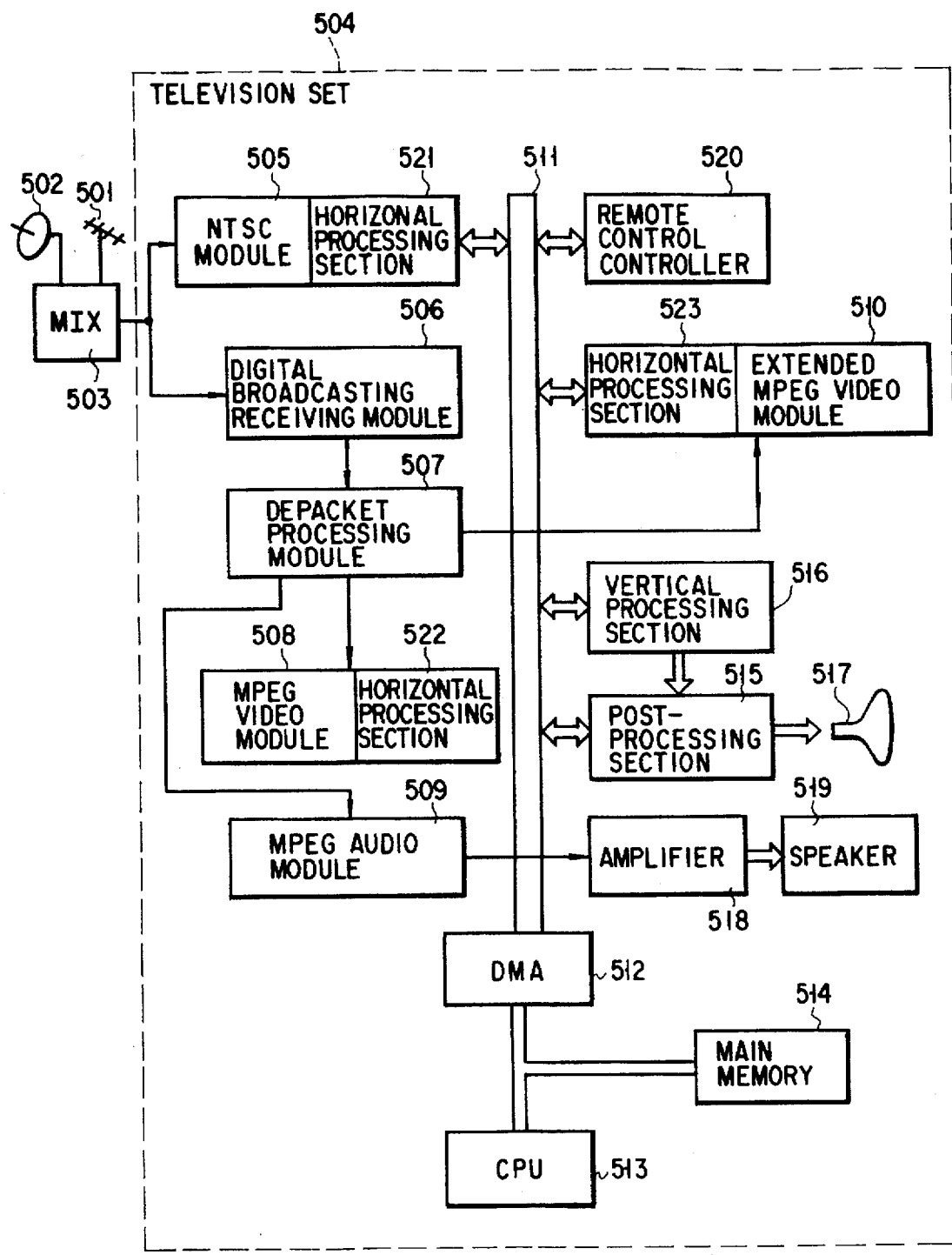
F I G. 20

DIGITAL TELEVISION SET

BACKGROUND OF THE INVENTION

1. Field of the Invention

This invention it relates to a digital television set, more specifically, relates to a digital television set which has an image processing device effective at the time of receiving a plurality of asynchronous video signals and displaying respective image data on one screen.

2. Description of the Related Art

As television broadcasting currently realized, there are following broadcasting:

(1) Broadcasting of the color NTSC system: This broadcasting system is described in pages 138–141 of "Broadcasting Method" (Nippon Hoso Shuppan Kyokai), published in Jun. 20, 1984.

(2) Broadcasting which combines the ones of the color NTSC method and the character multiplex broadcasting: The character multiples broadcasting system is described in pages 244–251 of "Broadcasting Method" (Nippon Hoso Shuppan Kyokai), published in Jun. 6, 1984.

(3) Broadcasting of the second generation EDTV system using the digital technology: This broadcasting system is described in the Television Society Technical Reports vol. 1. 17, No. 65, pp 19–42, BCS' 93-42 (December 1993).

(4) Broadcasting utilizing a satellite, that is, ISDB (Integrated Service Digital Broadcasting):

This broadcasting system is described in the Television Society Technical Reports vol. 1. 115,No. 35, pp 31–36, BCS' 91-38 (December 1991), and "Hierarchical Model of ISDB" in ITE'93, 15-6 and "Highly Functionalized Digital TV Service" in ITE'93, 15-8, of 1993 Television Society Annual Meeting.

(5) Broadcasting by the digital CATV system:

This broadcasting system is described in pages 82–89 of the Nikkei Electronics, published in May 23, 1994.

As described above, various kinds of TV broadcasting systems exist at present, and broadcasting services are diversified. Furthermore, there are a plurality of image formats that are used.

On the other hand, TV viewers have decoders corresponding to respective broadcasting signals to view programs of respective broadcasting systems. Currently, however, there are requests to display and view on the same display various kinds of programs over respective broadcasting systems.

SUMMARY OF THE INVENTION

In order to satisfy the above requests, a plurality of asynchronous video signals have to be digitalized and supplied, respectively, to the same image processing device. In this case, as functions requested to the image processing device, there can be mentioned horizontal compression, vertical compression, expansion processing function, and a function to flexibly set the compression/expansion ratio, and a function to obtain synchronism between respective video signals. Furthermore, it is required to minimize to the extent possible any increase in the size of hardware.

Therefore, the object of the present invention is to provide a digital television set which can perform the compression/expansion processing flexibly, without increased hardware size, and can easily synchronize a plurality of asynchronous image data, thereby displaying various kinds of broadcasting services simultaneously on the same screen.

In order to attain the above object, the present invention comprises a plurality of horizontal processing means which horizontally compress or expand the respectively input image data, and output respective horizontally processed image data, a transfer means which transfers time-divisionally the respective horizontally processed image data processed by the plurality of horizontal processing means, a vertical processing means which vertically compresses or expands time-divisionally the respective horizontally processed image data transferred by the transfer means, and output a composed image data, and a display means to display the image based on the composed image data from the vertical processing means.

According to the above means, respective image data based on a plurality of images are horizontally processed by a plurality of horizontal processing means, and transferred time-divisionally by the transfer means. The vertical processing means vertically processes time-divisionally the respective image data input time-divisionally and send the vertically processed image data to the display means, and the display means subjects the plurality of images to a predetermined deformation processing and displays the deformed images. Additional vertical processing means are not necessary for displaying a plurality of images because the vertical processing means is used in a time-shared manner for processing a plurality of images.

The display means includes:

a region-setting means for setting the image region to deform the image originated in the image data from the vertical processing means, based on the picture-making command for making a picture having a predetermined shape, and an image-deforming means to map the image data in the image region, while deforming the image data, by the address transformation of the memory means which stores the image data from the vertical processing means.

It is possible to deform into the three-dimensional image and display the animation received by the above-mentioned means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawing, which are incorporated in and constitute a part of the specification, illustrate presently preferred embodiments of the invention and, together with the general description given above and the detailed description of the preferred embodiments given below, serve to explain the principles of the invention.

FIGS. 3A–3E are timing charts for illustrating the operation of the circuit of FIG. 2;

FIGS. 4A–4E are timing charts for illustrating the operation of the circuit of FIG. 2;

FIG. 5 is a block diagram showing a concrete structure of the bus controller 338 of FIG. 1;

FIG. 9 is a block diagram showing a concrete structure of the memory section 418 in FIG. 7;

FIG. 10 is a block diagram showing a concrete structure of the header-adding circuit 368 of FIG. 2 and the header analysis section 393 of FIG. 7;

FIGS. 11A–11E are signal diagrams for illustrating the operation of the circuit of FIG. 10;

FIG. 12 is a block diagram corresponding to the circuit of FIG. 1 by simplifying the circuits of FIG. 2 and FIG. 7;

FIG. 14 is a view showing other embodiment of the vertical processing circuit;

FIG. 15A–15E are timing charts for illustrating the operation of the vertical circuit of FIG. 14;

FIG. 16 is a block diagram showing the post-processing circuit;

FIG. 17 is a flow chart for illustrating examples of the operation of the post-processing circuit;

FIG. 18 is a view illustrating examples of the image display;

FIG. 19 is a vie showing the way how the virtual polygon plane is converted in the operation of the post-processing circuit;

FIG. 20 is a view showing the overall structural example of the television set of the present invention.

DETAILED DESCRIPTION OF THE PREFERRED EMBODIMENTS

One preferred embodiment of the present invention will now be described with reference to the accompanying drawings.

Figure 1:
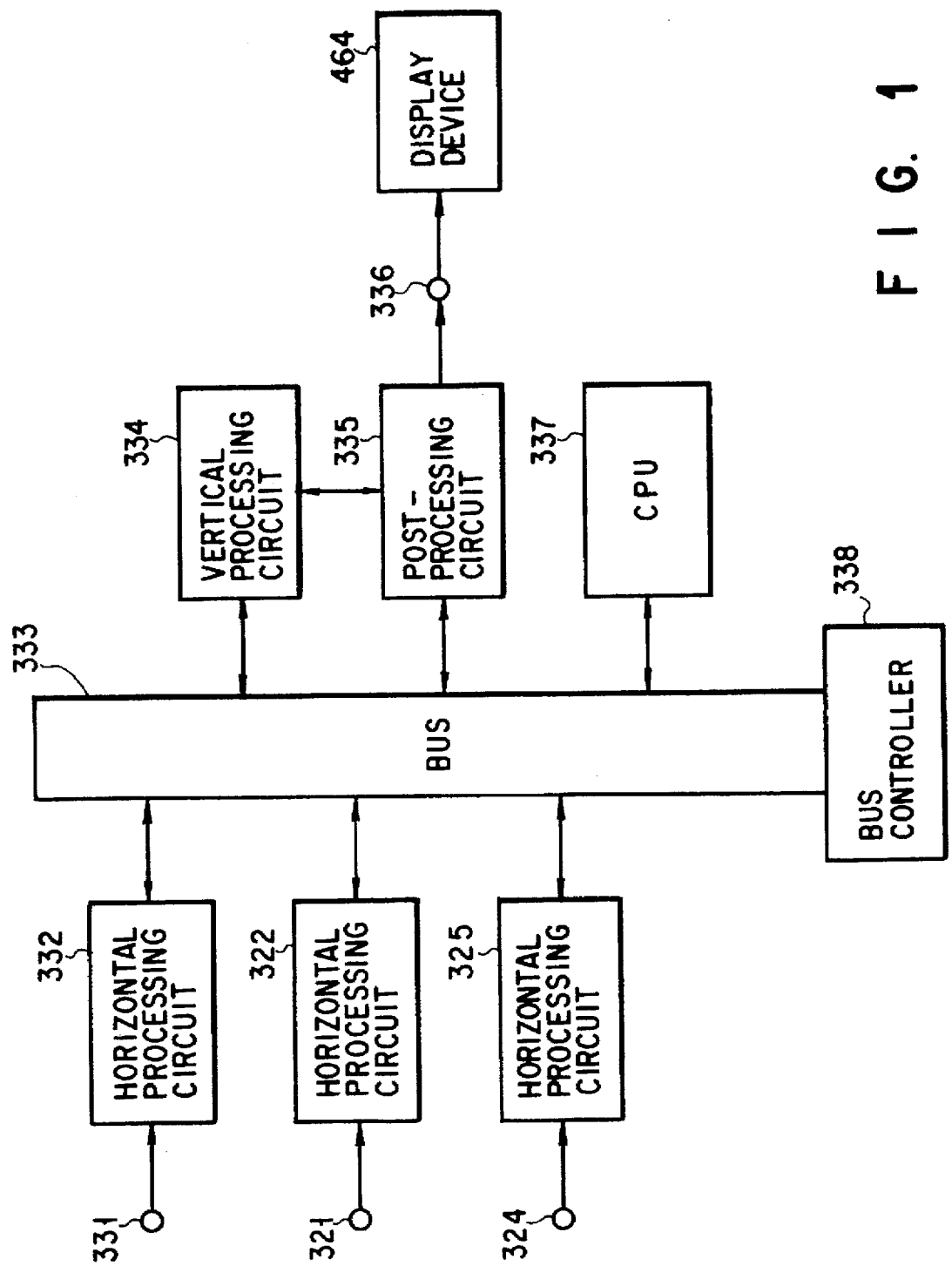
FIG. 1 is a block diagram showing one embodiment of the television set according to the present invention.

FIG. 1 is a block diagram showing one embodiment of the digital television set according to the present invention. Asynchronous image data are respectively supplied to the input terminals 331, 321 and 324. The image data input to the input terminals 331, 321 and 324 are respectively supplied to the horizontal processing circuits 332, 322 and 325. The horizontal processing circuits 332, 322 and 325 perform the compression or expansion processing of the respectively input image data in the horizontal direction and output them to the bus 333.

The image data transferred via the bus 333 are supplied to the vertical processing circuit 334. The data transfer of the image data by the bus 333 is controlled by a bus controller 338.

The vertical processing circuit 334 subjects the horizontally processed image data to the compression/expansion processing in the vertical direction to outputs the image data to the post-processing circuit 335. The post-processing circuit 335 subjects the input image data to the deformation processing based on the program to output it from the output terminal 336. The signal of the output terminal 336 is supplied to the display device 464 such as a liquid crystal display or a color Braun tube.

CPU 337 transfers the filter coefficient for the compression processing and the expansion processing in the horizontal processing circuits 332, 322 and 325 and the vertical processing circuit 334 via the bus 333, as well as outputs the control data for controlling each section. Furthermore, CPU 338 can supply the graphic data for displaying the predetermined graphic image to the post-processing circuit 335 via the bus 333.

According to the above-mentioned device, the image data subjected to the horizontal processing to be horizontally processed is output to the bus 333 and transferred to the vertical processing circuit 334. Therefore, since the data quantity of the image data is reduced by the horizontal processing, there is no need to make the operation of the bus in high speed. Therefore, it is effective to build a cheap and stable system.

The post-processing circuit 335 can subject the input graphic data to the predetermined deformation processing, and can output the data for displaying the graphic image as well as the image based on the image data from the vertical processing circuit. Namely, the post-processing circuit 335 can synthesize the graphic image data from CPU 338 with the image data from the vertical processing circuit 334. The post-processing circuit 335 can not only display the image data on the square window, but also display the image data after subjecting it to the predetermined deformation processing, whereby it has a high degree of freedom in display. Furthermore, the post-processing circuit 335 subjects the high quality image having completed the horizontal and vertical processings to mapping on the graphic image, and can realize special effects by the high quality image easily and with a high degree of freedom, and correspond flexibly to the new broadcasting services such as a multi-image service and the like.

Furthermore, the device described above has a structure to supply the input image data subjected to the horizontal processing to the vertical processing circuit 334 via the bus 333, thereby even if a data processing to realize a multi-screen which displays a plurality of images on the same screen simultaneously is performed by using a plurality of horizontal processing circuits 332, 322 and 325, the data processing at the vertical processing circuit 334 can be performed time-divisionally, and it becomes possible to process the plural images in a relatively small sized structure by sharing a hardware.

Figure 2:
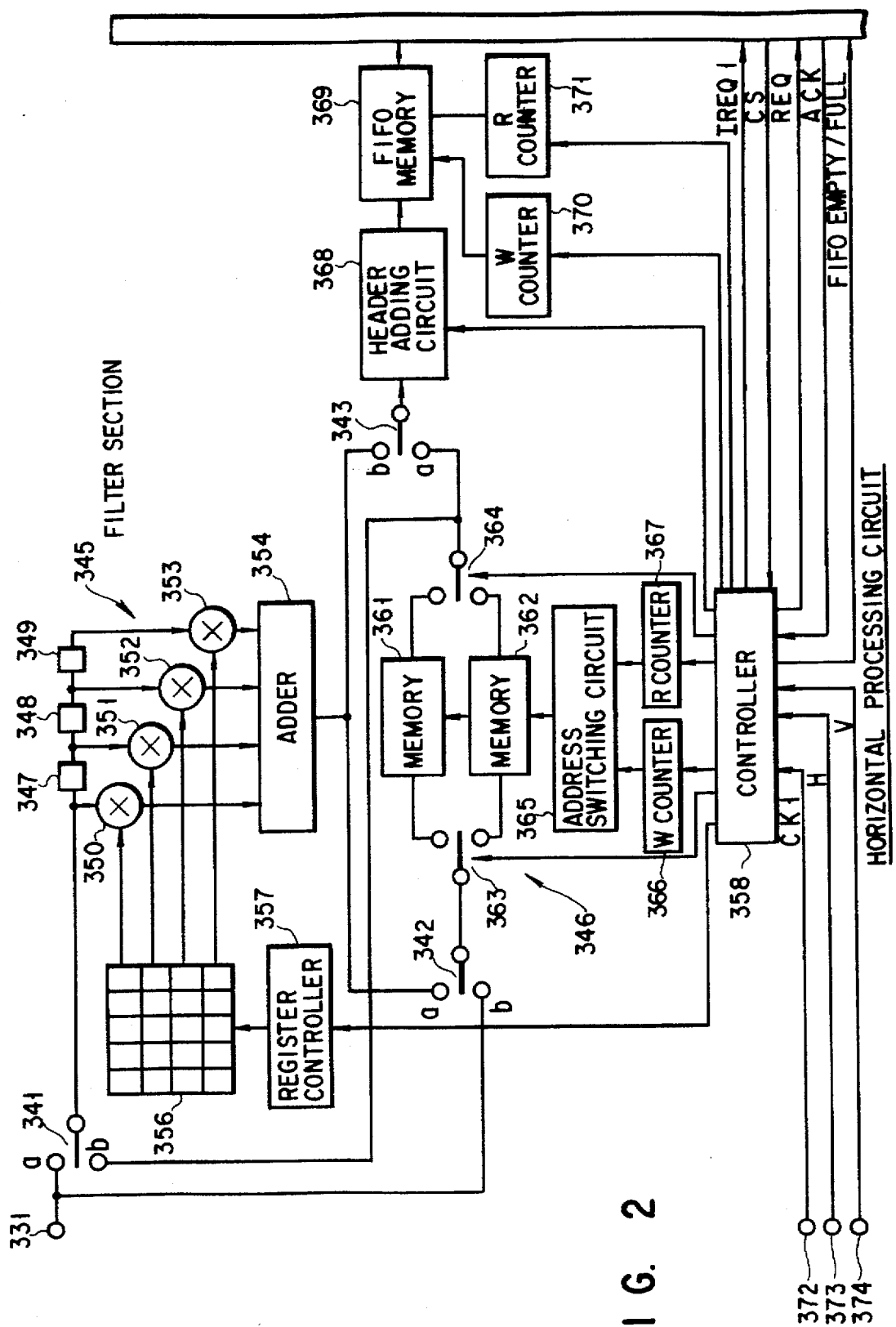
FIG. 2 is a block diagram showing a concrete structure of the horizontal processing circuit of FIG. 1.

FIG. 2 is a block diagram showing a concrete structure of the horizontal processing circuit 332 in FIG. 1. Incidentally, horizontal processing circuits 322 and 325 in FIG. 1 have the same structure with that of the horizontal processing circuit 332, therefore the illustration and explanation thereof will be omitted. Moreover, the horizontal processing circuits have a luminance signal processing system and a color-difference signal processing system, and output signals processed by respective processing systems in multiplicity, but in FIG. 2, for making the explanation simple, only the processing system of the luminance signal is shown.

Referring to FIG. 2, the horizontal processing circuit 332 has a filter section 345 and a compression/expansion section 346. The image data is supplied from the input terminal 331 to a terminal "a" of a switch 341 and a terminal "b" of a switch 342. The terminal "a" of the switch 342 is connected to the terminal "b" of a switch 343. Switches 341, 342 and 343 are controlled by the control data from CPU 337 to operate together, and select the terminal "a" at the time of compression processing of the image data, and select the terminal "b" at the time of expansion processing thereof.

Now, it is assumed that the horizontal compression processing is to be performed.

The image data from the input terminal 331 is supplied to the filter section 345 via the switch 341. The filter section 345 has unit delay elements 347-349. The image data on respective input sides of unit delay elements 347, 348 and 349 are input to multipliers 350, 351 and 352, and the image data on the output side of the unit delay element 349 is input to the multiplier 353. To multipliers 350, 351, 352 and 353, coefficients are given, respectively, from the coefficient register 356. And the operation results of the multipliers 350, 351, 352 and 353 are added by an adder 354.

The selection of coefficients output from the coefficient register 356 and the output timing are controlled by a register controller 357, and the register controller 357 is operated based on the sequence control data from the controller 358. To the coefficient register 356, a coefficient for the filter calculated by CPU 337 is also transferred. In addition, the register controller 357 switches the coefficient of the register 357 for the compression processing and the expansion processing.

The output of the adder 354 is subjected to the horizontal filter processing, and given to terminal "a" of the switch 342 or the terminal "b" of the switch 343. Since it is a compression processing now, the terminal "a" of the switching 342 is selected and the output of the adder 354 is supplied to the switch 363. The switch 363 supplies the input image data to the memory 361 or 362 based on the control of the controller 358. The output image data of the memory 361 and 362 are supplied, respectively, to one input terminal and the other input terminal of the switch 364. The switch 364 is also controlled by the controller 358. The output image data of the switch 364 is supplied to the terminal "a" of the switch 343 and the terminal "b" of the switch 341.

The address switching circuit 365 operates such that when supplying the write address from the W counter 366 to the one memory of memories 361 and 362, it supplies the read address from the R counter 367 to the other memory. And the controller 358 controls the address switching circuit 365 so that write and read with respect to the memories 361 and 362 are switched for every horizontal scanning period. Namely, when the switch 363 selects the memory 361 to write the image data, the switch 364 selects the memory 362 to read the image data. And when the switch 363 selects the memory 362 to write the image data, the switch 364 selects the memory 361 to read the image data. W counter 366 and R counter 367 are controlled by the controller 358 to generate the write address and the read address of the memories 361 and 362, respectively. The compression and the expansion of the image data is made possible by setting the write address and the read address from W counter 366 and R counter 367.

The image data selected by the switch 363 is supplied to the header-adding circuit 368. The header-adding circuit 368 adds a header to the image data and outputs it to the FIFO memory 369, in order to transfer the identification of a plurality of asynchronous image data and the horizontal and vertical timings. W counter 370 and R counter 371 are controlled by the controller 358 to generate the write address and the read address of the FIFO memory 369, respectively, and supplies them to the FIFO memory 369. To the FIFO memory 369, the image data is written at a clock timing of the input image data, and the FIFO memory 369 outputs the image data stored therein to the bus 333 at a clock timing corresponding to the bus 333.

To the controller 358, the clock signal, the horizontal synchronizing signal and the vertical synchronizing signal are input via terminals 372-374 to generate the timing signal for controlling respective sections. Furthermore, the controller 358 outputs an interrupt signal (IREQ1) and a request signal (REQ) described below to the bus 333, while being given a chip select signal (CS) and an acknowledge signal (ACK) from the bus 333. Furthermore, FIFO empty/full signal showing the state of the FIFO memory 369 is output.

When the image expansion processing is performed, the input image data from the input terminal 331 is subjected to the expansion processing at memories 361 and 362 via the switch 342, and input to the filter section 345 to be subjected to the filter processing. And the image data output from the adder 354 is input to the header-adding circuit 368 via the switch 343.

The operation of thus constituted horizontal processing circuit 332 will be described with reference to FIG. 3 and FIG. 4.

FIGS. 3 and 4 are timing charts for illustrating the operation of the compression/expansion section 346.

At the time of compression processing when the switches 341-343 select the terminal "a", the image data input via the input terminal 331 is supplied to the filter section 345 from the switch 341 and subjected to filtering, and thereafter is supplied to the compression/expansion processing section 346 via the switch 342 to be subjected to the compression processing. On the contrary, at the time of expansion processing, since the switches 341-343 select the terminal "b", the input image data is supplied to the compression/expansion processing section 346 from the switch 342, then supplied to the filter section 345 via the switch 341.

First, the case of the compression processing will be described with reference to FIG. 3. FIG. 3 shows the case where the image is compressed to ⅔ in the horizontal direction.

The image data (FIG. 3A) input via the input terminal 331 is filtered in the filter section 345. When the horizontal compression rate is ⅔, the register controller 357 controls the coefficient value of the coefficient register 356 to make the coefficient of the first image data "1", among the image data of three pixels continued in the horizontal direction, and make the coefficients of the next two image data "½", respectively. In this case, the output of the adder 354 is the one to add, as shown in FIG. 3B, the pixel data multiplied by the coefficient "½".

To the memories 361 and 362 is given the write address alternately in the horizontal period, and the image data shown in FIG. 3B are written in sequence. On the other hand, at the time of read, in memories 361 and 362, the read address is supplied such that the stored image data are divided for every three pixels, and the only first two pixels of each division are read. Therefore, from the switch 364, as shown in FIG. 3C, the input image data is converted to the rate of ⅔ in the horizontal direction and is output.

The image data from memories 361 and 362 are supplied to the header-adding circuit 368, and a header is added thereto, thereafter the image data is supplied to the FIFO memory 369. The image data is supplied to the FIFO memory 369 at a clock shown in FIG. 3D, and is read out at the clock of the frequency of twice as fast as the write clock, as shown in FIG. 3E.

Next, the case of the expansion processing will be described with reference to FIG. 4. FIG. 4 shows the case where the image is expanded to 3/2.

At the time of expansion processing, switches 341-343 select the terminal "b". The image data (FIG. 4A) input via the input terminal 331 is supplied to the compression/expansion section 346. This image data is written in memories 361 and 362 based on the write address from W counter 366. Then, when the data is read out from memories 361 and 362, as shown in FIG. 4B, the image data of two pixels are read out for the three clock period. Thus, as shown in FIG. 4B, an output where temporary pixel M3 is inserted for every three pixels is obtained. The output of memories 361 and 362 are given to the filter section 345 via switches 364 and 341.

In this case, the filter section 345 functions as the interpolation filter. Namely, multipliers 350–353 multiplies the first data M1 among data M1, M2 and M3 of three pixels including the inserted temporary pixel data by 1 and ⅓ as the coefficient value, and multiplies the next data M2 by ⅔. The adder 354, as shown in FIGS. 4B and 4C, outputs the first data M1 directly as the first data T1 of three pixels. And the adder 354, as shown in FIGS. 4B and 4C, adds the data of ⅓ times of the first data M1 and the data of ⅔ times of the second data M2 to make the second data T2, and adds the data of ⅔ times of the second data M2 and the data of ⅓ times of the first data M1' of the next three pixels to make the third data T3. Thus, the image data for three pixels are obtained by interpolating one pixel with respect to the input image data of two pixels.

The image data from the adder 354 is supplied to the header-adding circuit 368 via the switch 343, and a header is added thereto, thereafter the image data is supplied to the FIFO memory 369. In the FIFO memory 369, write is carried out by using a clock, as shown in FIG. 4D, synchronous with the input image data, and read is carried out synchronous with the clock corresponding to the bus 333, as shown in FIG. 4E.

Thus, the horizontal processing circuit 332 can perform compression and expansion in the horizontal direction of the image data by controlling the coefficient value by being controlled by CPU 337. In addition, in the present invention, two kinds of coefficients are used as the coefficient value, but it is clear that by increasing the kinds of coefficient, the filtering accuracy can be improved.

The image data processed by the horizontal processing circuit 332 is transferred via the bus 333 and supplied to the vertical processing circuit 334. The data transfer by the bus 333 is controlled by the bus controller 338.

FIG. 5 is a block diagram showing a concrete structure of the bus controller 338 in FIG. 1.

The bus controller 338 is composed of a bus control section 381 which checks the signal of the data transfer, a bus arbiter section 382 which controls the competition of the bus with CPU 337, an interrupt handling section 383, DMA (direct memory access device) 384 used for the data transfer, and a state machine 385 which controls the bus controller 338 and the overall system.

The bus control section 381 issues a bus request signal (REQ) for requesting the bus use based on FIFO empty and FIFO full showing the empty state of the FIFO memory of the device which sends data to the bus 333 and the device which is supplied data from the bus 333. And the bus control section 381 sends data based on ACK to the bus arbiter section 382, when the bus acknowledge signal (BUS-ACK) showing the acknowledgment of the bus use is given from CPU 337. The interrupt handling section 383 issues a bus request signal (BUS-REQ) to CPU 337, when the interrupt signal (IREQ1) showing the request for data transfer based on the processing completion is given from the horizontal processing circuit 332, and sends the data based on this BUS-ACK to the bus arbiter section 382, when the bus acknowledge signal (BUS-ACK) is given from CPU 337.

In addition, with regard to the bus 333, only the bus controller 338 and CPU 337 are the master, and other devices are slaves thereof, therefore the bus control section 381 has only to issue REQ to only CPU 337.

The bus arbiter section 382 sets the bus hold for controlling the release and securement of the bus 333 to the disable state ("1") or the enable state ("0"), based on the data from the bus control section 381 and the interrupt handling section 383. DMA 384 performs data transfer between devices via the bus 333. Each device has FIFO memory for input and output, and is connected with the bus 333 via FIFO memory, whereby selection of the device is possible by specifying each input/output address, and DMA 384 outputs only the chip selector signal (CS) to select the mutual devices. In addition, REQ and ACK from each device are the read and write clock of FIFO memory.

Next, the operation of the bus controller 338 will be described with reference to FIG. 6.

Figure 6:
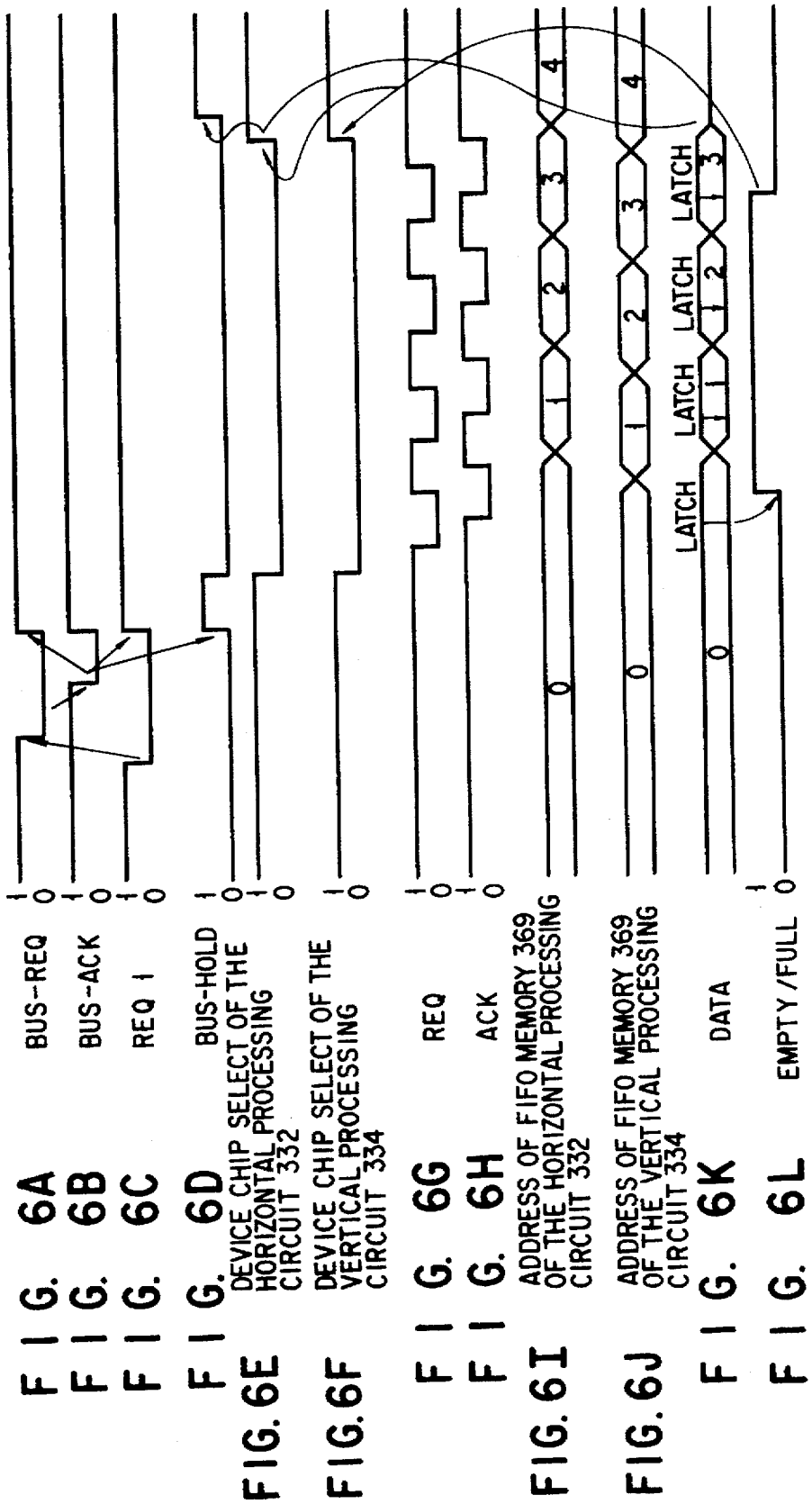
FIGS. 6A–6L are timing charts for illustrating the operation of the circuit of FIG. 5.

FIG. 6 is a timing chart for illustrating the data transfer control by the bus controller 338 and CPU 337 in FIG. 1.

It is assumed that when CPU 337 is using the bus 333, the horizontal processing circuit 332 completes the compression or expansion processing in the horizontal direction. Then, the horizontal processing circuit 332 outputs the interrupt signal (IREQ1) which is the request for data transfer accompanied with the processing completion to the interrupt handling section 383 of the bus controller 338 (FIG. 6C). The interrupt handling section 383 issues BUS-REQ for requesting the use of the bus 333 to CPU 337 (FIG. 6A).

CPU 337 transfers BUS-ACK for acknowledgment of the use of the bus 333 (FIG. 6B) to the interrupt handling section 383, as well as releasing the bus 333 by setting BUS-HOLD disable. The interrupt handling section 383 outputs the data based on BUS-ACK to the bus arbiter section 382, and the bus arbiter section 382 sets BUS-HOLD enable, as shown in FIG. 6D. Thereby, the bus 333 is secured for data transfer of the horizontal processing circuit 332.

DMA 384 outputs the chip selector signal CS shown in FIGS. 6E and 6F to specify FIFO memory 369 of the horizontal processing circuit 332 and the FIFO memory 392 of the horizontal processing circuit 334 described below, and transfers the image data from the horizontal processing circuit 332 to the vertical processing circuit 334. Namely, DMA 384 specifies the addresses of FIFO memories 369 and 392 shown in FIGS. 6I and 6J, and the bus control section 381 outputs REQ and ACK shown in FIGS. 6G and 6H.

In addition, the image data from the horizontal processing circuit 332 is transferred in block in a burst mode. Furthermore, the block size to be transferred is smaller than the size of FIFO memory 369 for output of the horizontal processing circuit and the size of FIFO memory 392 for input of the vertical processing circuit 334.

When the image data stored in FIFO memory 369 is transferred, FIFO empty shown in FIG. 6L is generated. When the bus control section 381 detects FIFO empty, as shown in FIGS. 6E and 6F, DMA 384 stops the output of the chip select signal CS, and the bus arbiter section 382 releases the bus 333 by setting BUS-HOLD to disable, as shown in FIG. 6D.

Thus, data transfer from the horizontal processing circuit 332 to the vertical processing circuit 334 is carried out. Similarly, data transfer via the bus 333 among the horizontal processing circuit 332, the vertical processing circuit 334, the post-processing circuit 335 and CPU 337 is controlled.

Referring to FIG. 1, the data subjected to the horizontal processing is input to the vertical processing circuit 334 via the bus 333, and the vertical processing circuit 334 subjects the image data to the compression/expansion processing in the vertical direction and output the image data to the post-processing circuit 335.

Figure 7:
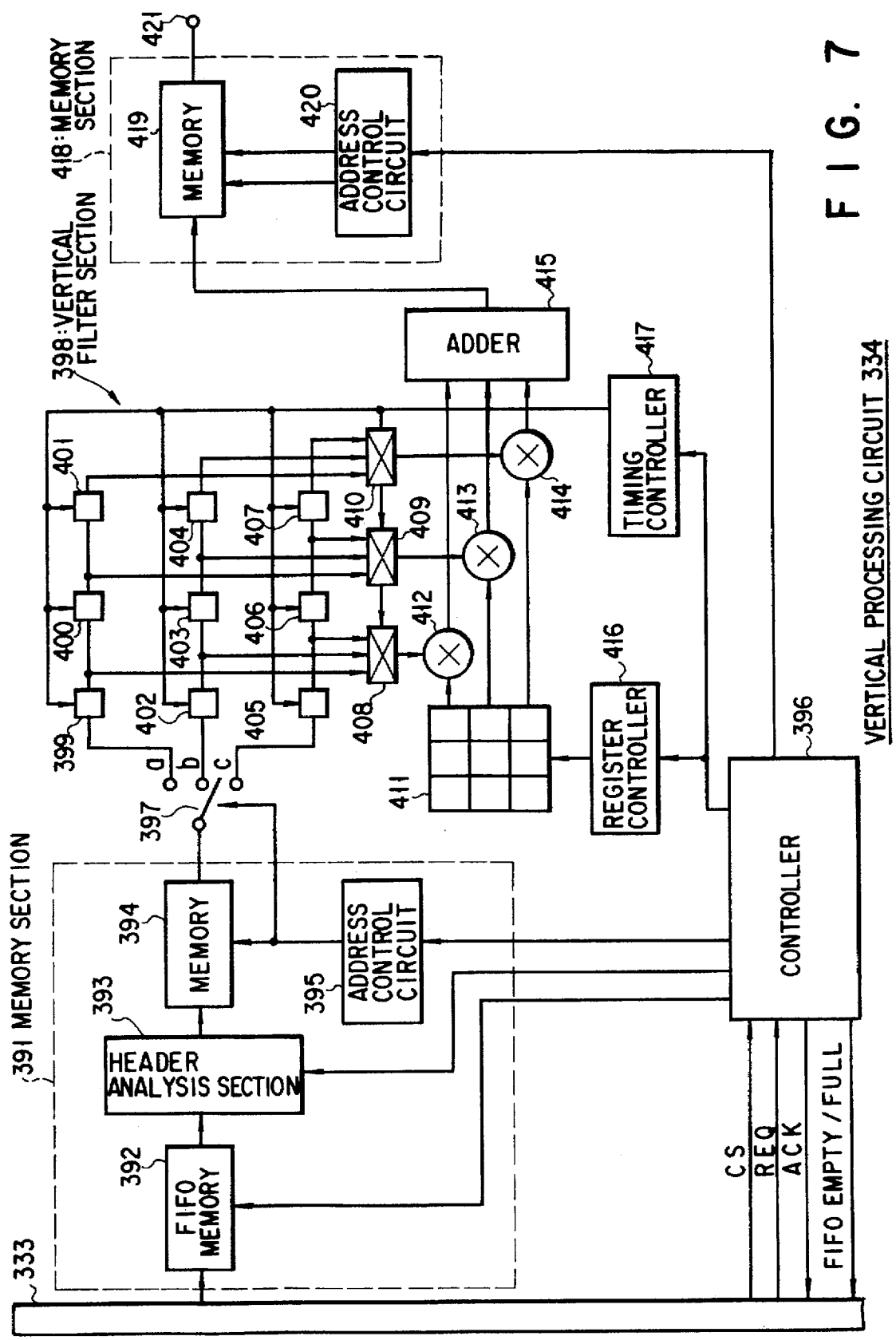
FIG. 7 is a block diagram showing a concrete structure of the vertical processing circuit 334 of FIG. 1.

FIG. 7 is a block diagram showing a concrete structure of the vertical processing circuit 334 in FIG. 1.

Figure 8:
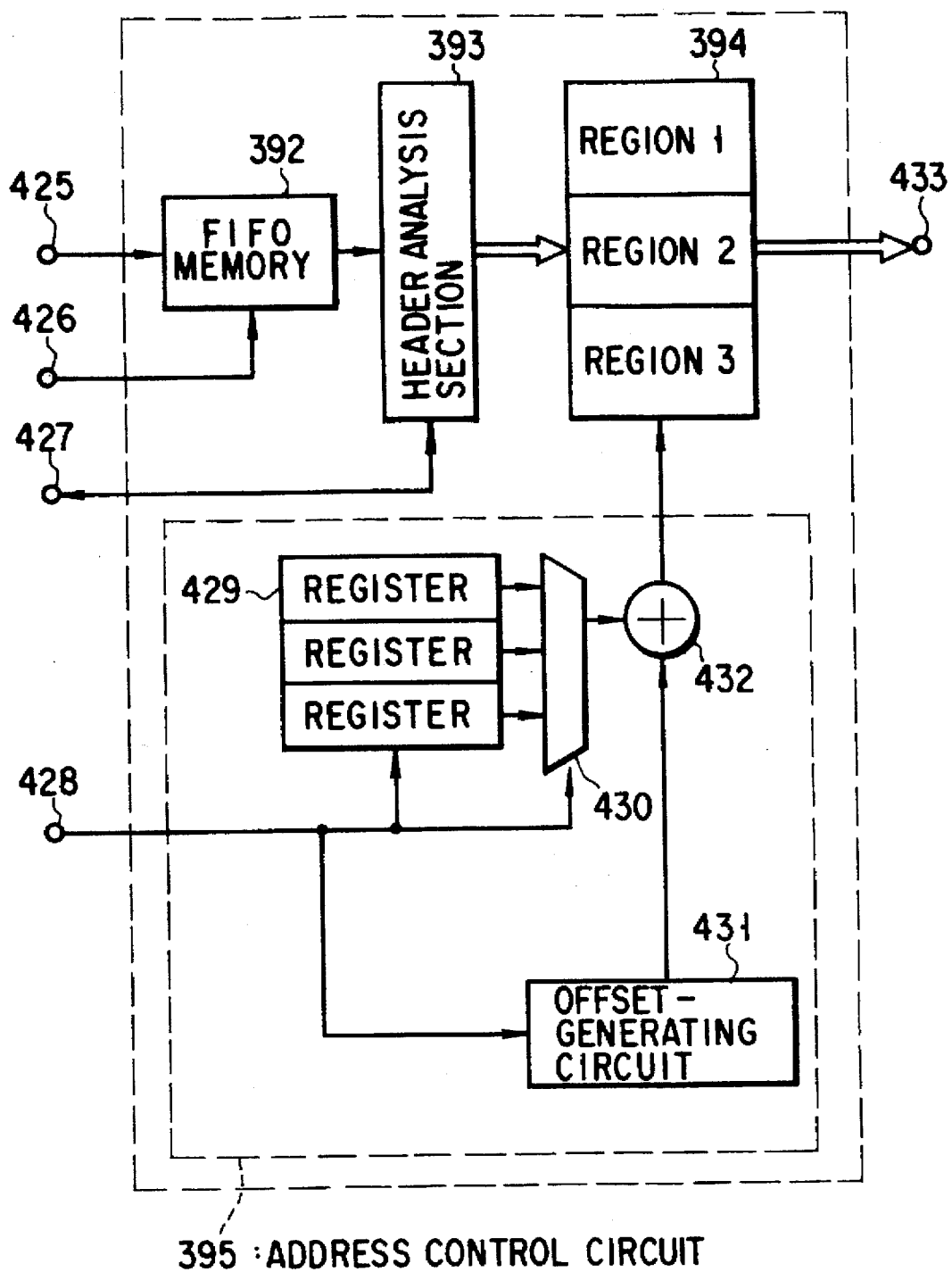
FIG. 8 is a block diagram showing a concrete structure of the memory section 391 of FIG. 7.

FIG. 8 is a block diagram showing a concrete structure of the memory section 391 in FIG. 7.

Referring to FIG. 7, the data from the bus 333 is supplied to FIFO memory 392 of the memory section 391. FIFO memory 392 operates based on the control signal from the controller 396 to perform the data write processing at a clock rate of the data of the bus 333. FIFO memory 392 performs the data read processing at a clock rate of the vertical processing circuit 334, and the output image data is output to the memory 394 via the header analysis section 393. The header analysis section 393 extracts the header information added in the horizontal processing circuit 332, and this header information is given to the controller 396. The memory 394 is controlled by the address control circuit 395, and takes each image data corresponding to a plurality of images time-divisionally to divide and store each image data. As shown in FIG. 8, image A is stored in the first region, image B is stored in the second region, and image C is stored in the third region.

The address control circuit 395 will be described with reference to FIG. 8.

The address control circuit 395 has a segment register 429, and in this segment register 429, a plurality of segment addresses corresponding to respective images A, B and C are set by the controller 396. The selection circuit 430 switches said plurality of segment addresses from the segment register 429 time-divisionally, and sends them to the adder 432. Also the offset-generating circuit 431 is controlled by the controller 396 via the terminal 428 to generate and give the offset value to the adder 432. The adder 432 generates the address for the memory 394 by adding the offset value to respective segment addresses. Thereby, memory regions continued for every image are specified, for example, in the first to the third regions of the memory 394, image data based on images A, B and C are stored, respectively. In addition, in FIG. 8, the terminal 425 is an input terminal to which the image data from the bus 333 is input, the terminal 426 is an input terminal for the write/read address of FIFO memory 392, and the terminal 427 is an input terminal of the header information. The terminal 428 is connected to the controller 396. The image data read from the memory 394 is supplied to the switch 397 shown in FIG. 7, via the output terminal 433.

Incidentally, when the expansion processing is performed, a dummy data is to be inserted at a predetermined timing by the address control circuit 395. When the compression processing is performed, the insertion of the dummy data is not carried out.

The switch 397 is controlled by the address control circuit 395 and divide the input image data for every image and outputs the image data to the vertical filter section 398. To the output terminal "a" of the switch 397, there are connected in series the delay elements 399, 400 and 401, and delay of, for example, three lines of image A can be obtained by these delay elements 399, 400 and 401. To the output terminal "b" of the switch 397, there are connected in series the delay elements 402, 403 and 404, and delay of, for example, three lines of image B can be obtained by these delay elements 402, 403 and 404. To the output terminal "c" of the switch 397, there are connected in series the delay elements 405, 406 and 407, and delay of, for example, three lines of image C can be obtained by these delay elements 405, 406 and 407. The outputs of the delay elements 399, 402 and 405 are supplied to the selector 408, the outputs of the delay elements 400, 403 and 406 are supplied to the selector 409, the outputs of the delay elements 401, 404 and 407 are supplied to the selector 410. The outputs of the selectors 408, 409 and 410 are supplied, respectively, to multipliers 412, 413 and 414. To multipliers 412, 413 and 414, coefficients are given from the coefficient register 411.

Selectors 408, 409 and 410 are controlled by the timing controller 417 to select the outputs signal of elements 399, 400 and 401 when image A is processed, to select the output signals of elements 402, 403 and 404 when image B is processed, and to select the output signals of elements 405, 406 and 407 when image C is processed. Multipliers 412, 413 and 414 multiply the input image data by the coefficient from the coefficient register 411 and output the result to the adder 415. The adder 415 adds the outputs of the multipliers 412, 413 and 414 and outputs the result. This processing corresponds to the time-divisional vertical filtering processing of the image data.

In addition, the register controller 416 is controlled by the controller 396 to set each coefficient of the coefficient register 411. Furthermore, to the controller 396, the coefficient for filtering calculated by CPU 337 described below is transferred. The timing controller 417 controls the operational timing of each delay element 399–407 and each selector 408–410. Thereby, the position of the pixel of each image in the horizontal direction and the position of the pixel of each image in the vertical direction are adjusted. The output of the adder 415 is supplied to the memory section 418. The memory section 418 is composed of the memory 419 and the address control section 420, and stores the image data of each image in the divided regions.

FIG. 9 is a block diagram showing a concrete structure of the memory section 418 in FIG. 7.

Referring to FIG. 9, the output of the adder 415 is supplied to the memory 419 via the terminal 435. The controller 396 set a plurality of segment addresses corresponding to each image A, B and C to the segment register 437 of the address control circuit 420. The selection circuit 438 switches said plurality of segment addresses from the segment register 437 time-divisionally and gives them to the adder 441. Furthermore, the offset-generating circuit 439 is controlled by the controller 396 via the terminal 436, to generate the offset value and gives it to the adder 441. The adder 441 generates the address of the memory 394 by adding the offset value to each segment address. Thereby, memory regions continued for every image are specified, for example, image data based on respective images A, B and C are stored in the first, the second and the third regions of the memory 394, respectively.

Furthermore, the control circuit 396 gives a control signal to a write inhibit circuit 440 via the terminal 436. This write inhibit circuit 440 suspends to write the image data to the memory 419, whereby it can prevent the image on the display screen from being disturbed.

Namely, when a plurality of images are displayed on the screen, by changing the segment address given to the segment register 429 of the memory section 391 of FIG. 8 to change the allocation of each image region of the memory 394, the displayed position can be optionally changed. Thus, when the allocation of each image region of the memory 394 in the memory section 391 is changed, the image on the display screen is disturbed. In order to prevent it, the write inhibit circuit 440 suspends write of the image and release the inhibited state after the processing becomes stable. This write inhibit processing can be performed at a high speed, whereby the image quality is not deteriorated. In addition, since the write inhibit circuit 440 inhibits write of the image data, the image can be reduced. The write inhibit processing is performed synchronously with the output data of the vertical filter section 398.

As described above, by controlling respectively the address with respect to the memories 394 and 419 by the address control circuits 395 and 420, thinning out or insertion of the image data are performed, and the interpolation processing is performed by the vertical filtering processing by the vertical filter section 398. Thus, the image data can be compressed or expanded in the vertical direction by the vertical processing circuit 335.

As described above, in this device, the image data of a plurality of images A, B and C processed by a plurality of horizontal processing circuits 332, 322 and 325 are transferred asynchronously to the vertical processing circuit 334. Therefore, it is important that in the horizontal processing circuits 332, 322 and 325, a synchronous signal (header information) is added, and in the vertical processing circuit 334, the synchronous signal (header information) is detected to prevent the confusion of the data. Addition of the header information is performed by the header-adding circuit 368 (see FIG. 2) and the detection of the synchronous signal is performed by the header analysis section 393 (see FIG. 7).

FIG. 10 is a block diagram showing a concrete structure of the header-adding circuit 368 and the header analysis section 393 in FIG. 2 and FIG. 7, and FIG. 11 is a view illustrating the operation thereof.

The header-adding circuit 368 is composed of a clipping circuit 442, a data-adding circuit 443 and a header-generating circuit 444. The image data input via the input terminal 448 (FIG. 11A) is, for example, quantized in 8 bits, and has a level of from 0 to 255. This input image data is given to the clipping circuit 442, and as shown in FIG. 11B, is restricted to the level of from 0 to 254 and supplied to the data-adding circuit 443. On the other hand, the horizontal synchronous signal H and the vertical synchronous signal V input via the terminals 449 and 450 are given to the header-generating circuit 444. The header-generating circuit 444 outputs the data showing the current line number (FIG. 11C) based on the horizontal synchronous signal H and the vertical synchronous signal V. In addition, the header-generating circuit 444 is adding the data having a level of 255 to the top of the data of the line number and outputting it. The data-adding circuit 443 adds the current line number to the top of the horizontal scanning period of the input image data and outputs the data shown in FIG. 11D from the output terminal 465.

The image data is restricted to the level of 254, and since the header information is added with a data having a level of 255, the header and the image data are easily identified. The image data from the output terminal 465 is to be transferred asynchronously via the bus 333.

The header analysis section 393 is composed of the data separation circuit 445, the controller 446 and the data analysis circuit 447. The image data input via the input terminal 466 is given to the data separation circuit 445. The data separation circuit 445 determines the level of the input data, and when the level is 255, gives the input data to the data analysis circuit 447, and when the level is below 254, outputs 10 the input data from the output terminal 467, as well as outputs the data to the controller 446. The data analysis circuit 447 detects the line number from the input data and outputs the detected line number to the controller 446. The controller 446 recognizes the horizontal and vertical image position of the current image based on the line number and outputs a predetermined timing information via the output terminal 468.

Thus, it is made possible to collectively handle a plurality of image data transferred asynchronously.

FIG. 11E shows one example of the packet style of the image data. The data section is composed of, for example, 48 pixels. This is because, for example, in the main profile-main level of MPEG2, the image format has 720 pixels in the horizontal direction, and 720=48×15, therefore 48 pixels becomes one-to-integer. Moreover, in the NTSC method, 48×16=768. Therefore, when the image data is expressed by 8 bits as the amplitude value, the data length becomes 48 bytes. Furthermore, the header section is composed of 4 bytes including the identifier. Therefore, 48+4=52 bytes becomes one packet of the image data.

The packet of the image data is not restricted to the above-mentioned embodiment, and various data may be included as the header information, that is, the horizontal and vertical positional information and the compression ratio information of said image data.

The post-processing circuit 335 shown in FIG. 1 subjects the input image data to the predetermined deformation processing and outputs the deformed image data from the output terminal 336. CPU 337 transfers the filter coefficient for the compression/expansion processing in the horizontal processing circuit 332 and the vertical processing circuit 334 via the bus 333, as well as outputs the control data for controlling each section. Furthermore, CPU 337 supplies the graphic data for displaying the predetermined graphic image via the bus 333 to the post-processing circuit 335. In addition, the post-processing circuit 335 can subject the input graphic data to the predetermined deformation processing, and can output the data for displaying the graphic image as well as the image based on the image data from the vertical processing circuit 334.

In the device of FIG. 1, since a plurality of image data processed by a plurality of horizontal processing circuits are transferred asynchronously to the vertical processing circuit, it is necessary to add the synchronous signal in the horizontal processing circuits and detect this synchronous signal in the vertical processing circuit. This addition of the synchronous signal is performed by the header-adding circuit 368 (see FIG. 3) and the detection of the synchronous signal is performed by the header analysis section 393 (see FIG. 8). Thereby, the image to which the image data belongs and the horizontal and vertical position in said image is determined by the header information composed of the identifier and the line number.

FIG. 12 shows each processing circuit of FIG. 2 and FIG. 7 by making them more simple, adding the horizontal processing circuits 322 and 335 so as to approach the structure of FIG. 1.

The horizontal processing circuit 332 is assumed to be composed of the horizontal processing section 451, a multiple section 454 and FIFO memory 369. Similarly, it is assumed that the horizontal processing circuits 322 and 325 are respectively composed of the horizontal processing sections 452, 453, multiple sections 455, 456 and FIFO memories 457, 458. The image data of three images (luminance signal Y and color difference signal C) are supplied to the horizontal processing sections 451, 452 and 453, respectively. The horizontal processing sections 451, 452 and 453 subject the input image data to the compression or expansion in the horizontal direction, and outputs the image data to the multiple sections 454,455 and 456, respectively. The horizontally processed luminance signal Y and the color difference signal C are multiplied, and output to the selector 459 via FIFO memories 369, 457 and 458. In addition, the selector 459 is shown in a switch-like type in order to illustrate the time-divisional processing operation of the bus 333 of FIG. 1 clearly understandable.

The image data from FIFO memories 369,457 and 458 are selected by the bus controller 338 and supplied to the vertical processing circuit 334 time-divisionally via the selector 459. That is, each image data is transferred time-divisionally in a predetermined time unit via the bus 333, therefore the transfer of each image data does not compete. Furthermore, the image data based on a plurality of images is input to the bus 333, however, if it is compressed in the horizontal direction, the number of pixels are reduced, whereby it is not caused to exceed the transfer capacity of the bus 333.

The FIFO memory 360 of the vertical processing circuit 334 outputs the input image via a demultiplexer 461. The address control circuit 395 specifies the address of the memory 394 and makes the image data stored in different regions for every image. The vertical processing section 462 subjects the image data of the memory 394 to the compression or expansion processing in the vertical direction and outputs said image data to the memory 419. The memory 419 is controlled by the address control circuit 420 for its write and read, and outputs the image data subjected to the vertical processing to the matrix circuit 463. R, G and B signals are generated from the luminance signal and the color difference signal by the matrix circuit 463 and is output to the post-processing circuit 335.

Each image data is changed to a predetermined size by the vertical processing circuit 334. In this case, the vertical processing circuit 334 processes a plurality of images time-divisionally, and is shared for the processing of a plurality of images. Therefore, even if multi-screens are used, the increase of the size of the hardware can be suppressed.

The post-processing circuit 335 subjects the image data horizontally and vertically processed to the deformation processing and outputs the deformed image data to the display device 464. Thereby, pictures based on the plural images are displayed on the display screen of the display device 464 in a desired size and in desired display conditions.

Figure 13:
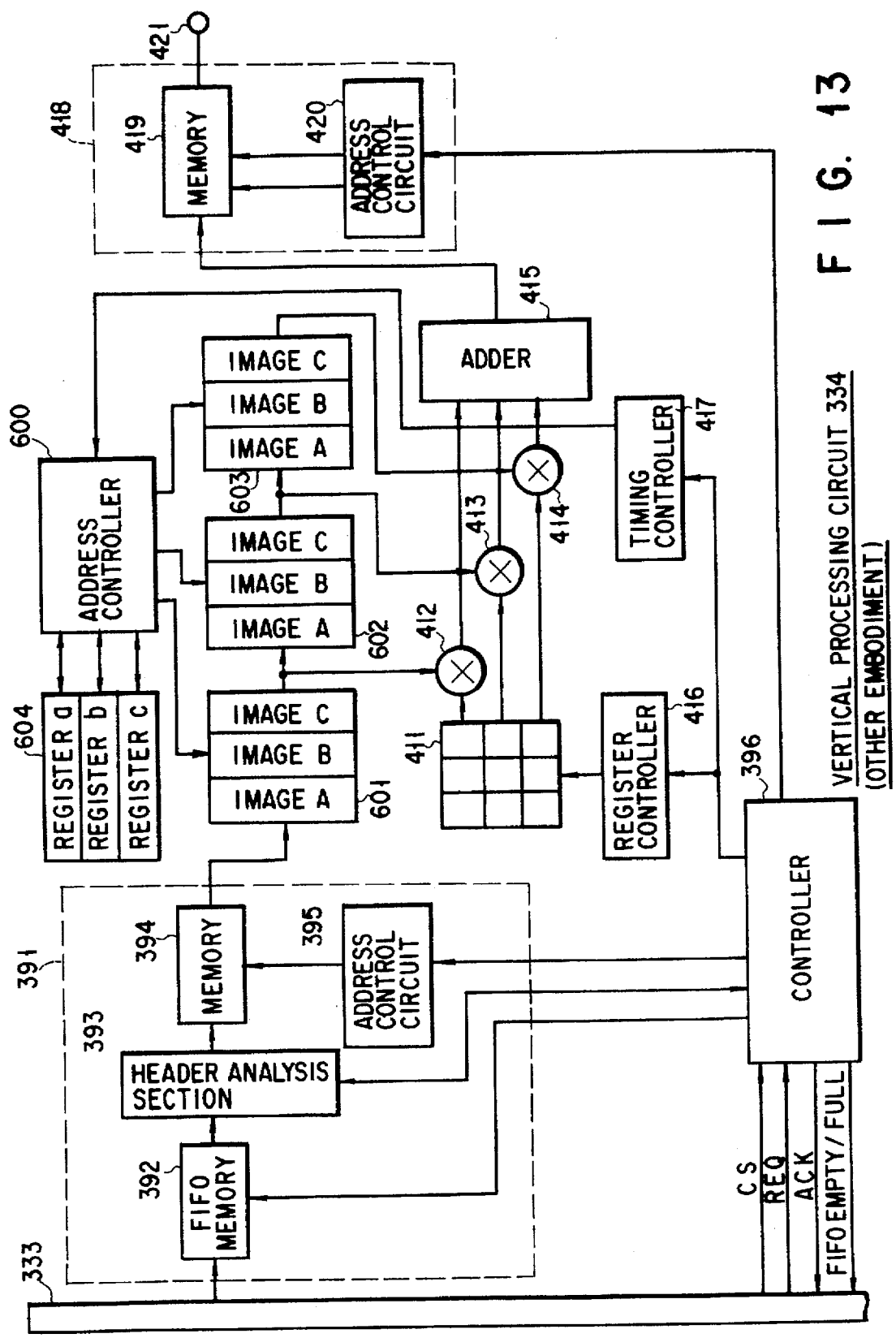
FIG. 13 is a block diagram showing another embodiment for the vertical processing circuit.

FIG. 13 is another embodiment of the vertical processing circuit 334.

The same reference numerals are given to the same parts with the vertical processing circuit shown in FIG. 7. In the circuit of FIG. 13, the circuit section composed of the switch 397, delay elements 399–407, and selectors 408–410 in FIG. 7 is displaced with a circuit composed of memories 601, 602 and 603, a register 604, and an address controller 600. Namely, the image data output from the memory 394 is input to the memory 601, and the output of the memory 601 is input to the memory 602, and the output of the memory 602 is input to the memory 603. To memories 601, 602 and 603, data is accessed by the address output from the address controller 600. When the image data of three images A, B and C are input, respective memories 601, 602 and 603 are separated to the memory region for every image by the output address from the register 604 connected to the address controller 600. In the register 604, the address for the image A, the address for the image B and the address for the image C are stored, and said address is chosen according to the kind of the image currently input. Since an identifying signal of the image currently input from the controller 396 is given to the address controller 600, the address is chosen based on this identifying signal. When the image data of memories 601, 602 and 603 are read, the data in the same address is read, and given to the multipliers 412, 413 and 414. To the multipliers 412, 413 and 414, coefficients are given from the coefficient register 411. The output of the multipliers 412, 413 and 414 are input to the adder 415. The subsequent processings are the same with the circuit of FIG. 7.

FIG. 14 is a block diagram showing other embodiment of the vertical processing circuit 334.

The same reference numerals are given to the same constituents with those of FIG. 7. and FIG. 13 and explanations thereof will be omitted.

This vertical processing circuit is different from the circuit of FIG. 7 in that a memory 394 in FIG. 7 is deleted and a memory section composed of switches 471 and 475, memories 472 and 473, and an address control circuit 474 is provided instead of the memory section 418. The output of the vertical filter section 398 is supplied to the switch 471. The switch 471 supplies the input image data to memories 472 and 473, while switching over. The image data read from memories 472 and 473 are output to the output terminal 421 via the switch 475. Switches 471 and 475 cooperate such that when one switch selects the memory 472, the other selects the memory 473. The address control circuit 474 controls switching of switches 471 and 475, and specifies the address of memories 472 and 473, and when write is performed to one memory, read is performed from the other memory.

FIG. 15 is a timing chart for illustrating the operation of thus constituted embodiment.

FIG. 15 shows the example where asynchronous images A and B are input, and FIGS. 15A–15E shows, respectively, a frame timing of image A, a field timing of image A, a frame timing of image B, and the write address and the read address.

The image data from the vertical filter section 398 is supplied to the memories 472 and 473 via the switch 471. As shown in FIGS. 15A–15C, images A and B are input asynchronously. Here, for example, it is assumed that display is carried out at a timing corresponding to image A. In this case, the address control circuit 474 gives a write address which agrees with the vertical timing of image B (FIG. 15D) to the memories 472 and 473, and gives a read address which agrees with the vertical timing of image A (FIG. 15E) to the memories 472 and 473. As shown in FIGS. 15D and 15E, the address is specified to be thinned out at the time of read, and the image data read from the image memories 472 and 473 are the ones which reduce image B. By such write and read, image B can be compressed and output so as to agree with the timing of image A.

In addition, as shown in FIGS. 15D and 15E, since the write address and the read address are asynchronous, there is caused a divergence between the written image data and the read image data. For example, the image data read by the read address R1 is the one to be written by the write address W1. Therefore, the image data read by the next read address R2 is essentially the image data written by the write address W2. But since the write and read are asynchronous, before read by the read address R2 is completed, the next image data in the field of even 10 number is input. Therefore, in this case, by inhibiting write of the image data of this field of even number, the image data in the former field of odd number which has been written by the write address W1 is read by the read address R2. Thereafter, image data written by write addresses W2–W5 are read by the read addresses R3–R6, respectively. And at the read address R7, returning to the normal read, the image data in the field of even number written by the read address R6 is read.

Thus, the address control circuit 474 specifies the write address and the read address asynchronously, whereby asynchronous image data can be read synchronously.

FIG. 16 is a block diagram showing the embodiment of the post-processing circuit 335 adopted for the television set of this invention.

This post-processing circuit 335 is composed of a drawing processing section 481, an information storing section 482, an ante-processing section 483, a display control section 484 and a frame memory 485. To the drawing processing section 481 is input an image data subjected to the horizontal and vertical processing from the vertical processing circuit 334. The information storing section 482 is connected to a bus (not shown), and the data of the longitudinal and lateral sizes of the image displayed from CPU 337 is supplied thereto. Data from the information storing section 482 is given to the ante-processing section 483 and is subjected to a predetermined ante-processing. Data from the information storing section 482 and data from the ante-processing section 483 are given to the drawing processing section 481, and subjected to a predetermined drawing processing with respect to the input image data and output to the frame memory 485. The display control section 484 controls to output the display of the image data from the frame memory 485 based on the data from the information storing section 482 and the ante-processing section 483.

FIGS. 17–19 are views illustrating the operation of said post-processing circuit 335. FIG. 17 is a flow chart showing the flow of the post-processing. FIG. 18 is a view illustrating one embodiment of the display, and FIG. 19 is a view illustrating the three-dimensional processing. FIGS. 17–19 are views to illustrate the embodiment where the animated image data from the vertical processing circuit 334 is displayed in an optional shape at an optional position on the screen by using a texture mapping technique in the three-dimensional CG (Computer Graphic) processing.

In the conventional television set, when multi-channel images are simultaneously displayed, PIP (Picture In Picture) processing which displays a reduced child screen in a parent screen is performed. In the television set of the present invention, not only PIP processing is possible, but also deformation of the animated image data is performed to make it possible to display in the display style desired by the user. In addition, the texture mapping technique in CG is mainly for processing to the static image data, but it has no problem even if an animated image data is used as the texture data.

In step S1 of FIG. 17, first the data for setting the display size of the image of each channel is transferred from CPU 337 to the information storing section 482 via the bus 333. Now, as shown in FIG. 18, it is assumed that image A based on channel A and image B based on channel B are simultaneously and three-dimensionally displayed. In this case, the three-dimensional CG technique is used.

Namely, the ante-processing section 483 prepares at step S2 a virtual polygon plane 491 shown in FIG. 19. The virtual polygon plane 491 has a same size with image A of channel A. Next, the ante-processing section 483 deforms, at step S3, the virtual polygon plane 491 based on the affine transformation of the following equation (1) using four apexes of the virtual polygon plane 491. Namely, this affine transformation is to rotate the polygon plane by 60 degree in the Y-axis (longitudinal) direction using the left edge A–B of the virtual polygon plane 491 as an axis. By this affine transformation, the virtual polygon plane 491 is expanded and contracted in the X-axis (lateral) direction to obtain a plane 492 shown in FIG. 19.

$$[XYZ1]=[xyz1]Rot(Y\text{-axis}) \tag{1}$$

wherein x, y, z: original coordinate value X, Y, Z: coordinate value after transformation $$Rot(z)=\begin{vmatrix} \cos(z) & -\sin(z) & 0 & 0 \\ \sin(z) & \cos(z) & 0 & 0 \\ 0 & 0 & 0 & 0 \\ 0 & 0 & 0 & 0 \end{vmatrix}$$

In the display shown in FIG. 18, image A of channel A is viewed by putting the left edge side at a position close to a point of view, and putting the right edge side at a position far from a point of view, therefore, the ante-processing section 483 contracts the length of the right edge by subjecting further the affine-transformed image data to perspective transformation to obtain finally a plane 493 shown in FIG. 19. In addition, this perspective transformation is expressed by the following equation (2). The ante-processing section 483 transfer the apex data of the plane 493 to the display control section 484 at step S4. Thus, the virtual polygon plane 491 is deformed to perform the texture mapping on the plane 493.

$$[X', Y', Z']=H[XYZ]/Z \tag{2}$$

wherein H: Z value of the projected plane.

Furthermore, deformation and texture mapping of the actual virtual polygon plane will be described in detail.

In the texture mapping, reverse conversion processing of the coordinate conversion processing is performed with respect to the virtual campus on the display coordinate system so that deformation of the texture is not caused when the texture is mapped on the virtual campus of the display coordinate system. Namely, since the basic virtual campus (corresponding to the virtual polygon plane 491) size and the texture data size are equivalent, prepare the basic virtual campus at the origin (the same coordinate value with the texture data), and give a depth value Z (Z=1) to the two-dimensional texture data (texel information). This means that the basic virtual campus and the texture data are in the state three-dimensioned as (Z=1), and both data can be processed similarly.

The following equation (3) shows the coordinate conversion processing on the display coordinate system. The coefficient relating to this coordinate conversion is transferred to the ante-processing section 483 from CPU via the information storing section 482 through the bus. On the other hand, reverse conversion of the coordinate conversion shown in this equation (3) is expressed by the following equation (4). Namely, the coefficient of equation (4) is obtained by the code reverse processing of the coefficient used for the coordinate conversion, removing the member of cosine (cos).

The ante-processing section 483 calculates the reverse conversion coefficient based on the coordinate conversion coefficient, at step S5, and transfers the calculation result to the drawing processing section 481.

$$[X_q, Y_q, Z_q, 1]=[X_p, Y_p, Z_p]Td\ TrzH/(Z_q+Zt) \tag{3}$$

wherein
- Xq, Yq, Zq: coordinate value after conversion
- Xp, Yp, Zp: coordinate value before conversion
- Td : affine transformation (parallel movement)
- Trz: affine transformation (rotational movement using z-axis as a center)
- Zt : distance from a point of view to the model
- H : Z value on the projected plane $$[Xp, Yp, Zp, 1] = [Xq, Yq, Zq, 1]*(Zq+Zt)\, Trz(-1)\, Td(-1)/H \quad (4)$$

wherein (−1): reverse conversion.

Thus, by the reverse conversion of equation (4), the coordinate conversion of the display position in the display coordinate system from the virtual campus to the basic virtual campus becomes possible.

Then the drawing processing section 481 takes in the image data from the vertical processing circuit 334. Thereby, the drawing processing section 481 utilizes said reverse conversion coefficient to integrate the taken image data and the basic virtual campus transferred from said processing section 483.

Then, at step S6, the drawing processing section 481 determines Z value for every pixel of the virtual campus by DDA (Digital Differential Analysis) operation to perform the texture mapping shown by the calculation of the following equation (5). Namely, the deformation processing of the image data is performed.

Thus, by mapping the animated image at a frame unit on the virtual polygon plane by the texture mapping, the deformation processing of the animated image on a real time basis is made possible.

The mapping result is written in the frame memory 485 from the drawing processing section 481 (step S7). When write is completed, the display control section 484 proceeds the processing from step S8 to step S9 to read the data in the memory 485 and supply and display it on the television picture tube at a predetermined timing. Thereby, three-dimensional display shown in FIG. 18 is carried out on the display screen of the picture tube 464.

$$[Xp,Yp,Zp,1] = [Xq,Yq,Zq,1] * \quad (5)$$

$$(Zq+Zt)/H \begin{vmatrix} \cos(Oz) & \sin(Oz) & 0 & 0 \\ -\sin(Oz) & \cos(Oz) & 0 & 0 \\ 0 & 0 & 1 & 0 \\ -dx & -dy & 0 & 1 \end{vmatrix}$$

Thus, in the present embodiment, by using the texture mapping technique, the image data subjected to the horizontal and vertical processing is directly deformed and is displayed in a desired display style. As multichannelization proceeds, the user interface becomes necessary for selecting the display style on the multiscreen according to need, and the present embodiment is best suited as a user interface described above.

In the above description, it is described such that both of channels A and B are three-dimensionally processed, but the image of one channel may be subjected to the compression processing and displayed as it is, and the image of the other channel may be subjected to the compression processing and thereafter subjected to the above-mentioned three-dimensional processing and displayed.

FIG. 20 is a block diagram showing the whole structure of the digital television set of this invention.

This television set makes it possible to receive not only analog broadcasting in the current NTSC system but also digital broadcasting. In addition, as the digital broadcasting, there are now ground wave broadcasting, satellite broadcasting and cable broadcasting.

The digital signal and the television signal induced from the antenna 501 for the ground broadcasting and the antenna 502 for the satellite broadcasting are supplied to the mixed circuit 503 (hereinafter referred to as "MIX"). The MIX 503 gives these signals to the television set 504.

The television set 504 has various kinds of modules such as NTSC module 505, digital broadcasting-receiving module 506, depacket processing module 507, MPEG video module 508, MPEG audio module 509 and extended MPEG video module, and a bus 511 connecting these modules. In addition, modules 505–510 are to realize respective decode functions. Also the television set 504 has DMA (Direct Memory Access Device) 512, CPU 513, main memory 514, post-processing section 515, vertical processing section 516, television picture tube 517, amplifier 518, speaker 519 and remote control controller 520 and the like.

In the main memory 514, a program for controlling the television set 504 is stored, and CPU 513 controls the whole system by performing processings based on this program. Furthermore, CPU 513 sets a parameter data with respect to respective modules 505–510, and can change the set parameter data, thereby can correspond to various input video signals. DMA 512 is controlled by CPU 513 to control the data transfer by the bus 511, and makes it possible to send/receive the data among respective modules 505–510.

NTSC module 505 is composed of processing sections such as a high frequency-receiving section (not shown), a picture-demodulating section and a color difference-demodulating section and the like, and decodes the television signal in the NTSC system input from MIX 503 to transform it to the digital signal and outputs the signal to the bus 511. Furthermore, NTSC module 505 has a horizontal processing section 521 having a similar structure as in FIG. 2. The digital broadcasting receiving module 506 receives the digital signal input from MIX 503, and outputs the digital data of the predetermined channel to the bus 511. The depacket processing module 507 receives a depacketed data input thereto via the bus 511, subjects this data to the depacket processing to transform it to the digital stream, and outputs the digital stream to the bus 511. MPEG video module 508 receives a video data encoded in the MPEG system input thereto via the bus 511, decodes this data, and outputs the decoded image data to the bus 511. MPEG video module 508 has a horizontal processing section 522 having a similar structure as in FIG. 2. MPEG audio module 509 receives the audio data encoded in MPEG system input thereto via the bus 511, decodes this audio data and outputs the audio data to the bus 511. In addition, MPEG video module 508 and MPEG audio module 308 correspond to the MPEG1 system or MPEG2 system. In order to correspond to the multiscreen, extended MPEG video module 510 having the same structure with MPEG video module 508 is also provided. Extended MPEG video module 510 has also a horizontal processing section 523 having a similar structure as in FIG. 2.

Respective modules 505–510 are connected by the bus 511, and sending/receiving of the data are controlled by DMA 512 to be shared by a plurality of broadcasting services. Furthermore, respective modules 505–510 may be used time-divisionally by the control of DMA 512, or may be used independently. Furthermore, by changing the parameters of these modules 505–510, it is possible to make each module correspond to the plural broadcasting services. Since respective modules 505–510 are divided into plural modules, they can be so constituted to be easily detachable from the television set 504 body.

The vertical processing section 516 receives the image data input thereto via the bus 511, subjects the image data to the compression/expansion processing in the vertical direction and outputs said image data to the post-processing section 515. The post-processing section 515 receives information regarding the image size displayed from CPU 513 input thereto, subjects the vertically processed image data to the predetermined deformation processing, and supplies the deformed image data to the picture tube 517. The picture tube 517 projects the image based on the image data from the post-processing section 515 on the display screen. The amplifier 518 amplifies the audio data input via the bus 511 and outputs the amplified audio data to the speaker 519. The speaker 519 outputs acoustically the supplied audio data. The remote control controller 520 outputs data to the bus 511 based on the user's operation with respect to the remote control device (not shown).

Next, operational example of said television set will be described.

It is assumed that multichannel images are displayed simultaneously on the display screen of the picture tube 517, based on user's remote control operation. For example, two channel's images of the digital broadcasting utilizing the satellite and one channel's image of the current NTSC broadcasting are to be displayed simultaneously. In addition, the digital broadcasting utilizing the satellite is assumed to have been encoded in MPEG system. The remote control data from the remote control controller 520 is supplied to CPU 513 via the bus 511. CPU 513 reads the information stored in the main memory 514 based on the remote control data, and transfers various parameters to respective modules 505–510. Incidentally, as the parameters, there are such data as the data length of the packet, the window size for displaying respective channels, and the like. CPU 513 transfers these parameter data to respective modules, and thereafter, initializes functions of respective modules to start the processing.

On the other hand, the analog television signal induced from the antenna 501 is input to NTSC module 505. A receiving channel is specified in NTSC module 505 from the remote control controller 520, and NTSC module 505 selects a predetermined channel from NTSC signal and decode it to obtain the picture signal of the base band. This picture signal is transformed to the digital image data and the audio data by NTSC module 505. Furthermore, the image data is subjected to the compression/expansion processing in the horizontal direction in the horizontal processing section 521 of NTSC module 505, and thereafter output to the bus 511. DMA 512 transfers the image data to the vertical processing section 516, and transfers the audio data to the amplifier 518.

On the other hand, the satellite broadcasting wave received by the antenna 502 is input to the digital broadcasting receiving module 506. The digital broadcasting receiving module 506 selects the channel based on the user's remote control operation, and outputs the digital bit stream to the bus 511. This digital bit stream is transferred to the depacket processing module 507 by DMA 512. The digital bit stream is transformed to the data line in the MPEG system by the depacket processing module 507 and output to the bus 511. DMA 512 transfers the data line of the video data among the data lines in the MPEG system output to the bus 511 to the MPEG video module 508, and transfers the data line of the audio data to MPEG audio module 509.

MPEG video module 508 and MPEG audio module 509 decode respective MPEG data lines of video and audio and restore them to the image data and the audio data. Furthermore, MPEG video module 508 subjects the decoded image data to the compression or expansion processing in the horizontal direction by the horizontal processing section 522 built in the module. DMA 512 transfers the restored image data and audio data to the vertical processing section 516 and the amplifier 518, respectively, via the bus 511.

Furthermore, the depacket module 507 transforms the digital bit stream to the MPEG data line, and transfers the data line to the extended MPEG video module 510 via the bus 511. The extended MPEG video module 510 decodes the transferred image data, subjects the decoded image data to the compression/expansion processing in the horizontal direction, and transfers the horizontally processed image data to the vertical processing section 516 via the bus 511.

DMA 512 controls the bus 511 to supply the image data from NTSC module 505, MPEG video module 508 and extended MPEG video module 510 time-divisionally to the vertical processing section 516. To the vertical processing section 516, the image data of each channel is time-divisionally supplied, and the vertical processing section 516 subjects each image data to the compression/expansion processing in the vertical direction and outputs the vertically processed image data to the post-processing section 515. Thus, the image data subjected to the compression/expansion processing in the horizontal and vertical directions are subjected to the predetermined deformation processing in the post-processing section 515 and supplied to the picture tube 517. Furthermore, the audio data is amplified by the amplifier 518 and thereafter supplied to the speaker 519. Thus, the image of the NTSC broadcasting and the image of two channels of the digital broadcasting are displayed on the display screen of the picture tube 517 in the display style desired by the user, and the acoustic output thereof is output from the speaker.

Thus, in this television set, images of the plural channels of multiple channels' broadcasting, for example, the current NTSC broadcasting and the digital broadcasting are subjected to the predetermined deformation processing and can be displayed simultaneously.

As described above, according to the present invention, there are such effects that while suppressing the increase of the hardware size, it can flexibly correspond to the extension of the broadcasting service.

Figure 21A:
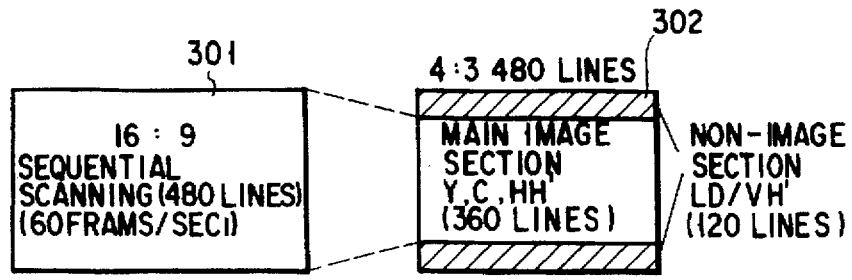
FIGS. 21A–21G are views showing various examples of the image format.
Figure 21B:
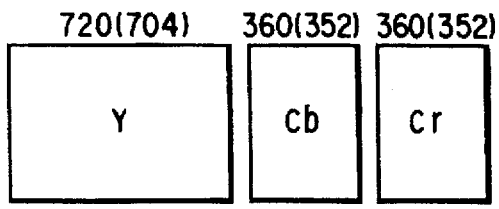
Figure 21C:
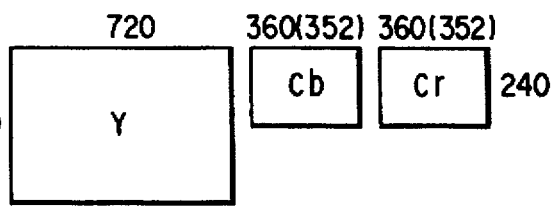
Figure 21D:
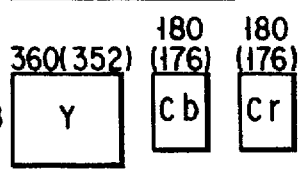
Figure 21E:
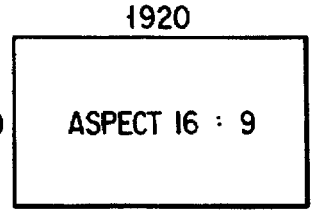
Figure 21F:
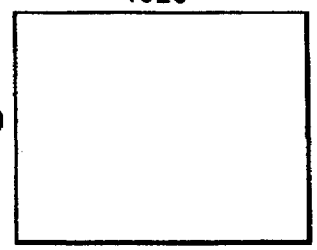
Figure 21G:
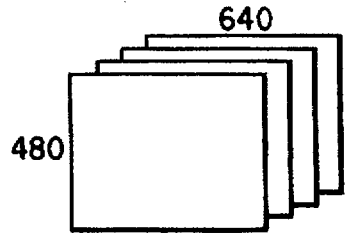

In FIGS. 21A–21G, there are shown various examples of the image format. According to the television set of the present invention, various kinds of image formats can be easily compressed or expanded at a desired ratio. FIG. 21A shows the image format adopted in the EDTV broadcasting. The image 301 of the wide screen having the aspect ratio of 16:9 is transformed to the image 302 of a letter box style and transferred. Therefore, at the television set, EDTV module is provided to transform the image 302 of a letter box style into the image 301 of the wide screen having the aspect ratio of 16:9. FIG. 21B shows the image of 422 format used as the studio standard. The figure in the longitudinal direction shows the effective scanning line number and the figure in the lateral direction shows the pixel number. Y shows the luminance signal, and Cb and Cr show the color. FIG. 21C shows the image of 420 format which subsamples the color signal of the image of 422 format to the half rate thereof. This 420 format is effective for the digital broadcasting and the bidirectional digital CATV broadcasting. FIG. 21D shows the CIF (Common Intermediate Format) adopted for the television telephone. This CIF format has fewer pixel numbers and line numbers than 420 format. FIG. 21E shows the image format adopted in ATV which is HDTV in USA. FIG. 21F shows the image of the high level 1440 level format of the MPEG2 standard. Furthermore, FIG. 21G shows the image format of VGA standard. The television set of the present invention makes it possible to process the image data of these various kinds of image format.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A digital television, comprising:
   a plurality of horizontal processing means for horizontally compressing or expanding image data input thereto, and then outputting the image data, respectively, each of the horizontal processing means including header adding means for dividing an associated one of the horizontally compressed or expanded image data into blocks each having a predetermined number of bytes, and adding header information including an identifier to a first one of image data pieces included in each of the blocks;
   transferring means for successively transferring blocks of image data that have been processed by the plurality of horizontal processing means;
   vertical processing means for successively vertically compressing or expanding the blocks transferred by the transferring means, and outputting the blocks, the vertical processing means including:
      (i) header analyzing means for analyzing the header information added to the first image data piece of each block transferred by the transferring means; and
      (ii) address controlling means for grouping the blocks into the image data in accordance with contents of the header information analyzed by the header analyzing means, and controlling storing of the blocks such that the image data is stored in respective regions of a memory; and
   displaying means for displaying an image based on the image data output from the vertical processing means.

2. A digital television according to claim 1, wherein each of the horizontal processing means comprises:
   a memory for storing filtered image data; and
   address allocating means for allocating write addresses to the memory for compression and expansion in accordance with a compression or expansion ratio.

3. A digital television according to claim 1, wherein each horizontal processing means includes memory means for storing output data of the header adding means, the output data being written in the memory means at a predetermined clock rate, and read therefrom at a clock rate of the transferring means.

4. A digital television according to claim 1, wherein the vertical processing means comprises:
   first, second and third memory sections for storing pieces of image data which correspond to a plurality of lines;
   distributing means for distributing the image data output from the memory to the first, second and third memory sections, the first, second and third memory sections storing the distributed image data; and
   outputting means for reading image data from the first, second and third memory sections, multiplying each of the read-out image data by an associated coefficient, adding the multiplied image data, and then outputting the image data.

5. A digital television according to claim 1, wherein the vertical processing means includes address control means for controlling, in a case where data is read from the memory, allocation of addresses to the memory such that data pieces are removed from the data or interpolated therein, thereby to vertically compress or expand an image.

6. A digital television according to claim 1, wherein the displaying means comprises:
   region setting means for setting an image region for use in deforming an image based on the image data output from the vertical processing means, in response to an image production command for production of an image having a predetermined shape; and
   image deforming means for deforming the image data output from the vertical processing means, and simultaneously mapping the image data on the image region, by converting data for allocation of addresses to storing means for storing the image data output from the vertical processing means.

7. A digital television according to claim 6, wherein the image production command is a command for processing model information of a three-dimensional image on the basis of a predetermined polygon figure information, and the region setting means sets the image region on the basis of an apex coordinate of a polygon figure obtained from the polygon figure information.

8. A digital television according to claim 1, further comprising:
   relating means for relating the vertical processing means and the displaying means to each other, the relating means comprising:
      (i) region setting means for setting an image region for use in producing an image based on image data output from the vertical processing means; and
      (ii) image deforming means for receiving information related to image region and the image data output from the vertical processing means, and deforming the image data, and simultaneously mapping the image data on the image region, by converting data for allocation of addresses to memory means for storing the image data.

9. A digital television set according to claim 8, wherein the vertical processing means successively outputs image data representing a plurality of images, the region setting means setting an image region for use in producing one of the plurality of images, and the image deforming means deforming the produced one image.

10. A digital television according to claim 8, wherein the vertical processing means successively outputs image data representing a plurality of images, the region setting means setting an image region for use in producing one of the plurality of images, and the image deforming means deforming the one of the plurality of images.

* * * * *